(12) United States Patent
Hilbers

(10) Patent No.: US 11,275,393 B2
(45) Date of Patent: Mar. 15, 2022

(54) AIR SPRING PRESSURE REGULATING VALVE

(71) Applicant: Pittway Sarl, Rolle (CH)

(72) Inventor: Ralf Hilbers, Waldbrunn (DE)

(73) Assignee: Pittway Sarl, Rolle (CH)

( * ) Notice: Subject to any disclaimer, the term of this patent is extended or adjusted under 35 U.S.C. 154(b) by 153 days.

(21) Appl. No.: 16/677,363

(22) Filed: Nov. 7, 2019

(65) Prior Publication Data

US 2021/0141403 A1    May 13, 2021

(51) Int. Cl.
G05D 16/20    (2006.01)
F16K 17/04    (2006.01)

(52) U.S. Cl.
CPC ........... *G05D 16/208* (2013.01); *F16K 17/04* (2013.01); *G05D 16/2097* (2019.01); *Y10T 137/7762* (2015.04)

(58) Field of Classification Search
CPC ........ Y10T 137/7761; Y10T 137/7762; G05D 16/208; G05D 16/2097; F16K 17/04
USPC ....... 137/487.5, 488; 417/31, 38, 44.2, 44.4, 417/44.3
See application file for complete search history.

(56) References Cited

U.S. PATENT DOCUMENTS

| | | | | |
|---|---|---|---|---|
| 2,401,144 A | * | 5/1946 | Dube ................. | G05D 23/1856 62/208 |
| 3,541,593 A | * | 11/1970 | Weston ................. | G05D 16/208 209/726 |
| 3,589,390 A | * | 6/1971 | Frantz ................... | F16K 17/105 137/489.5 |
| 4,201,517 A | * | 5/1980 | Ferguson .............. | F04B 49/022 417/12 |
| 4,254,634 A | * | 3/1981 | Akio ...................... | F25B 41/22 62/217 |

(Continued)

FOREIGN PATENT DOCUMENTS

| | | |
|---|---|---|
| CN | 204985892 U | 1/2016 |
| CN | 205036939 U | 2/2016 |

(Continued)

OTHER PUBLICATIONS

Search Report from counterpart European Application No. 20203977. 2, dated Mar. 9, 2021, 9 pp.

(Continued)

*Primary Examiner* — William M McCalister
(74) *Attorney, Agent, or Firm* — Shumaker & Sieffert, P.A.

(57) ABSTRACT

In some examples, a pressure regulating valve comprising a pressure chamber, a compressor configured to establish fluid communication with the pressure chamber, a vent valve configured to establish fluid communication with the pressure chamber, a pressure sensor, and a controller. The controller may determine a pressure based on the signal generated by the pressure sensor, and compare a pressure setpoint and the pressure. The controller may be configured to alter the pressure in the pressure chamber based on the comparison between the pressure setpoint and the pressure. For example, the controller may control the compressor to increase the pressure in the pressure chamber and/or control the vent vale to decrease the pressure in the pressure chamber. The altered pressure of the pressure chamber may generate movement of a restricting element within the pressure regulating valve.

20 Claims, 7 Drawing Sheets

(56) References Cited

U.S. PATENT DOCUMENTS

| | | | | | |
|---|---|---|---|---|---|
| 4,442,680 | A | * | 4/1984 | Barbier | G05D 16/166 62/217 |
| 5,348,036 | A | * | 9/1994 | Oksanen | G05D 7/03 137/1 |
| 5,615,832 | A | * | 4/1997 | Price | B05B 7/1404 137/489.5 |
| 5,624,394 | A | * | 4/1997 | Barnitz | A61M 1/74 604/67 |
| 5,709,368 | A | * | 1/1998 | Hajek, Jr. | F15B 13/0405 251/30.02 |
| 5,810,657 | A | * | 9/1998 | Pariseau | F24F 11/70 454/61 |
| 6,041,817 | A | * | 3/2000 | Guertin | F16K 51/02 137/565.23 |
| 6,056,008 | A | * | 5/2000 | Adams | G05D 16/2095 137/487.5 |
| 6,441,744 | B1 | * | 8/2002 | Adams | G01F 1/363 340/626 |
| 7,089,733 | B1 | * | 8/2006 | Jackson | F15B 11/165 60/422 |
| 2003/0070710 | A1 | * | 4/2003 | Inayama | G05D 16/2095 137/85 |
| 2005/0279454 | A1 | * | 12/2005 | Snijders | C23C 16/4412 156/345.29 |
| 2007/0175513 | A1 | * | 8/2007 | McLoughlin | G05D 16/208 137/87.02 |
| 2007/0207724 | A1 | * | 9/2007 | Coogan | G05D 16/208 454/238 |
| 2008/0251146 | A1 | * | 10/2008 | Folk | F16K 31/365 137/624.27 |
| 2009/0248210 | A1 | * | 10/2009 | Arenas | G05D 16/2095 700/282 |
| 2014/0034133 | A1 | * | 2/2014 | Beschorner | F15B 19/005 137/1 |
| 2016/0377192 | A1 | * | 12/2016 | Renollett | F15B 5/006 251/30.01 |
| 2018/0046206 | A1 | * | 2/2018 | Nguyen | G05D 16/2066 |

FOREIGN PATENT DOCUMENTS

| | | |
|---|---|---|
| EP | 2132612 B1 | 9/2015 |
| EP | 3100123 B1 | 12/2020 |
| KR | 101602715 B1 | 3/2016 |

OTHER PUBLICATIONS

Response to European Search Report from counterpart European Application No. 20203977.2, dated Mar. 9, 2021, filed on Nov. 12, 2021, 82 pp.

* cited by examiner

AIR SPRING PRESSURE REGULATING VALVE

TECHNICAL FIELD

The disclosure relates to pressure regulating valves.

BACKGROUND

Pressure regulating devices are frequently used in industrial and residential systems designed to deliver fluid flows to one or more gaseous or liquid fluid loads. The pressure regulating devices may be employed to deliver or maintain the delivered fluid within predetermined pressure parameters selected based on, for example, system integrity, process controls, various equipment restrictions, and/or other reasons. Pressure regulating devices may operate by sensing pressure fluctuations and making corrective adjustments around a pressure setpoint. Such pressure regulating devices may be employed within fluid delivery systems to maintain pressures downstream or upstream of the device.

SUMMARY

In examples described herein, a pressure regulating valve is configured to control a fluid pressure in a fluid circuit, such as piping header in a fluid distribution system, by at least controlling a pressure in a pressure chamber. The pressure regulating valve defines a flow area, through which fluid in the fluid circuit flows. A size of the flow area changes as a function of the pressure in the pressure chamber, and the size of the flow area affects the fluid pressure in the fluid circuit. Thus, the pressure regulating valve is configured to control the pressure in the fluid circuit by at least modifying the pressure in the pressure chamber. In some examples, the pressure regulating valve includes a controller configured to modify the pressure in the pressure chamber by at least controlling a compressor to increase the pressure in the pressure chamber and by at least controlling a vent valve to decrease the pressure in the pressure chamber. In some examples, increasing the pressure in the pressure chamber decreases the size of the flow area, which increases the fluid pressure through the valve, and decreasing the pressure in the pressure chamber increases the size of the flow area, which decreases the fluid pressure through the valve.

This disclosure also describes example techniques of using the pressure regulating valve to regulate a pressure.

Clause 1: A pressure regulating valve comprises a pressure chamber, a compressor configured to establish fluid communication with the pressure chamber, a vent valve configured to establish fluid communication with the pressure chamber, a pressure sensor configured to generate a signal indicative of a pressure, and a controller, the controller configured to determine a pressure setpoint for the pressure, determine the pressure based on the signal generated by the pressure sensor, compare the pressure setpoint and the pressure, and increase or decrease pressure in the pressure chamber based on the comparison of the pressure setpoint and the pressure, wherein the controller is configured to increase the pressure in the pressure chamber by at least controlling the compressor to increase pressure in the pressure chamber, and wherein the controller is configured to decrease the pressure in the pressure chamber by at least controlling the vent valve to decrease pressure in the pressure chamber.

Clause 2: The pressure regulating valve of clause 1, further comprising a restricting element and a sensing element in fluid communication with the pressure chamber, wherein the sensing element is configured to position in response to the pressure in the pressure chamber, and wherein the sensing element is configured to influence a position of the restricting element.

Clause 3: The pressure regulating valve of clause 1 or 2, wherein the restricting element comprises a valve disc, and wherein the pressure regulating valve further comprises a valve stem attached to the valve disc, a valve seat, and a flow area between the valve disc and the valve seat, wherein the sensing element is configured to translate the valve stem and alter the flow area in response to the controller increasing or decreasing pressure in the pressure chamber.

Clause 4: The pressure regulating valve of any of clauses 1 to 3, wherein the sensing element is configured to translate the valve stem and reduce the flow area in response to the controller increasing pressure in the pressure chamber, and wherein the sensing element is configured to translate the valve stem and increase the flow area in response to the controller decreasing pressure in the pressure chamber.

Clause 5: The pressure regulating valve of any of clauses 1 to 3, wherein the sensing element is configured to translate the valve stem and increase the flow area in response to the controller increasing pressure in the pressure chamber, and wherein the sensing element is configured to translate the valve stem and decrease the flow area in response to the controller decreasing pressure in the pressure chamber.

Clause 6: The pressure regulating valve of any of clauses 1 to 5 further comprising a spring element configured to translate the valve stem and reduce the flow area.

Clause 7: The pressure regulating valve of any of clauses 1 to 6 further comprising a valve inlet and a valve outlet, wherein the pressure regulating valve is configured to fluidly isolate the pressure chamber from the valve inlet and the valve outlet.

Clause 8: The pressure regulating valve of any of clauses 1 to 7 wherein the controller comprises a Proportional-Integral-Derivative (PID) controller, wherein the PID controller is configured to compare the pressure setpoint and the pressure, and use the pressure as a process variable.

Clause 9: The pressure regulating valve of any of clauses 1-8 wherein the controller is configured to receive a communication signal, and determine the pressure setpoint by at least associating the communication signal with a specific pressure.

Clause 10: The pressure regulating valve of any of clauses 1-9, wherein the controller is configured to receive a fluid leak signal, and increase or decrease the pressure in the pressure chamber to cause the sensing element to influence the restricting element to reduce or cease a flow through the pressure regulating valve in response to receiving the fluid leak signal.

Clause 11: The pressure regulating valve of any of clauses 1-11, wherein the wherein the pressure regulating valve comprises at least one of a poppet valve, a needle valve, a gate valve, a globe valve, a double-ported valve, or a spool valve.

Clause 12: A pressure regulating system comprising a valve comprising a pressure chamber, a valve inlet, a valve outlet, a sensing element in fluid communication with the pressure chamber, wherein the sensing element is configured to displace when a pressure in the pressure chamber increases or decreases, and a restricting element mechanically coupled to the sensing element, wherein the restricting element is configured to alter a flow area between the valve inlet and the valve outlet when the sensing element displaces, and a controller configured to determine a pressure setpoint, receive a signal indicative of a pressure, compare the pressure setpoint and the signal indicative of the pressure, control, based on the comparison, a compressor to increase the pressure in the pressure chamber and displace the sensing element and cause the restricting element to alter the flow area, and control, based on the comparison, a vent valve to decrease the pressure in the pressure chamber and displace the sensing element and cause the restricting element to alter the flow area.

Clause 13: The pressure regulating system of clause 12, wherein the sensing element comprises a diaphragm, a piston, or a diaphragm and a piston.

Clause 14: The pressure regulating system of clause 12 or 13, wherein the pressure comprises the pressure at the valve inlet, the system further comprising a pressure sensor configured to generate the signal indicative of the pressure at the valve inlet.

Clause 15: The pressure regulating system of any of clauses 12 through 14, further comprising a main valve comprising a main valve stem, wherein the valve is a pilot valve configured to control a position of the main valve stem.

Clause 16: The pressure regulating system of any of clauses 12 through 15, wherein the restricting element comprises a valve disc, and wherein the valve further comprises a valve stem mechanically coupling the valve disc to the sensing element, wherein the valve disc is configured to alter the flow area between the valve inlet and the valve outlet when the sensing element displaces.

Clause 17: The pressure regulating system of any of clauses 12 through 16, further comprising the compressor, the vent valve, and a pressure sensor configured to generate the signal indicative of the pressure at the valve inlet.

Clause 18: A method of regulating a pressure, the method comprising receiving, by a controller, a pressure signal indicative of a pressure, determining, by the controller, the pressure based on the signal, determining, by the controller, a pressure offset between the pressure and a pressure setpoint, altering, by the controller, a pressure in a pressure chamber of a pressure regulating valve based on the pressure offset by at least one of causing a compressor to increase the pressure in the pressure chamber, or causing a vent valve to vent the pressure chamber and decrease the pressure in the pressure chamber, wherein the altered pressure generates movement of a sensing element in fluid communication with the pressure chamber, and wherein the movement of the sensing element alters a flow area between a valve inlet and a valve outlet.

Clause 19: The method of clause 18, wherein receiving the pressure signal comprises receiving, by the controller, the pressure signal from a pressure sensor, wherein the pressure signal is indicative of a pressure at the valve inlet.

Clause 20: The method of clause 18 or 19, wherein movement of the sensing element alters the flow area by at least causing a restricting element to translate a valve stem and a valve disc, wherein the valve disc is in fluid communication with the flow area.

The details of one or more examples are set forth in the accompanying drawings and the description below. Other features, objects, and advantages will be apparent from the description and drawings, and from the claims.

DETAILED DESCRIPTION

Figure 1:
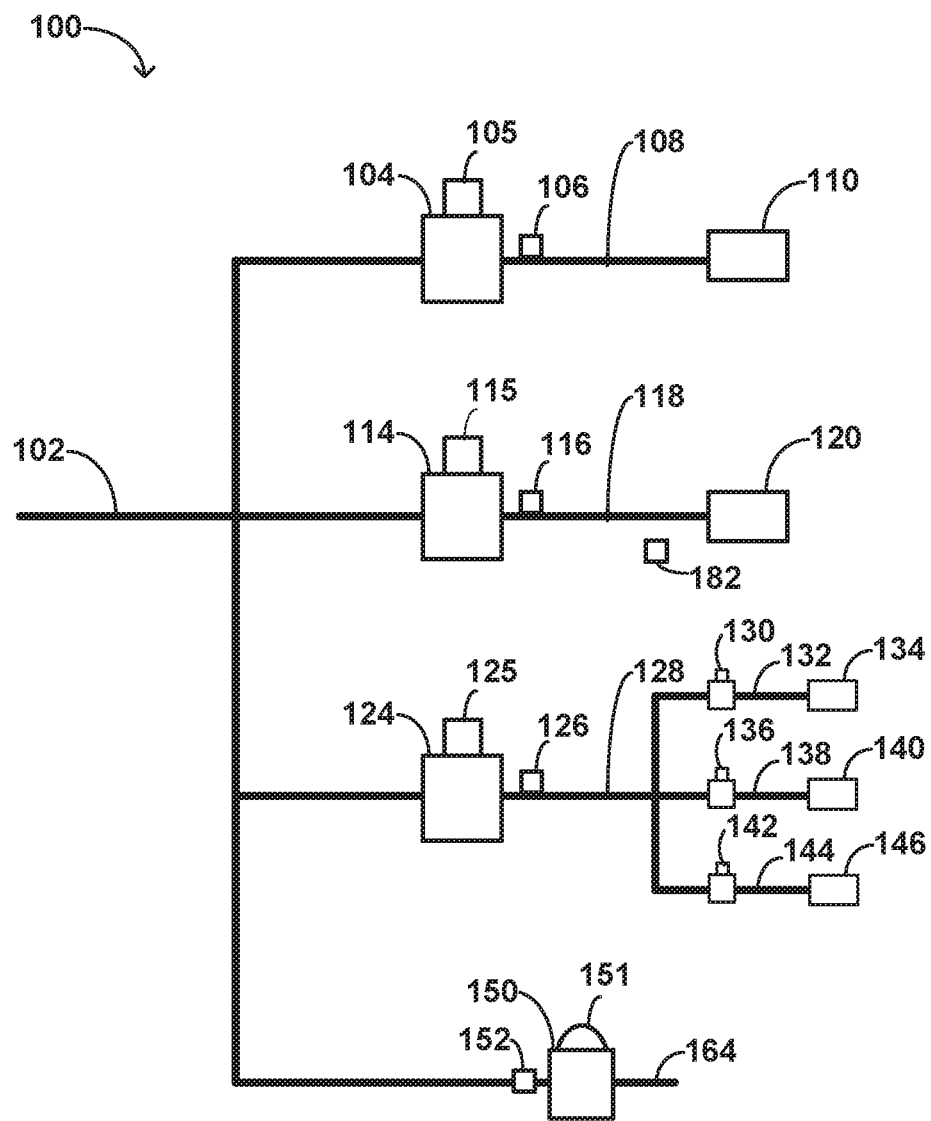
FIG. 1 is a conceptual diagram illustrating an example fluid system.

Pressure regulating valves are used in industrial and residential applications to control a pressure of a fluid in a fluid circuit. In some example systems, pressure regulating valves are situated between a main, higher pressure circuit and one or more branch, lower pressure circuits. The pressure regulating valve so situated may manipulate fluid flows provided from the main circuit in order to compensate for increases or decreases in demand by the one or more branch circuits, increases in the pressure of the main circuit (e.g., a back-pressure regulator), or some other load disturbance or combination of load disturbances.

For example, in some water distribution systems, pressure regulating valves may be used between a pumping station and a piping network serving consumers, in order to maintain a substantially constant water pressure in the piping network as demand among consumers fluctuates. As another example, in some natural gas delivery systems, pressure regulating valves may be used to reduce gas pressure from transmission pipelines to a distribution tap serving farm for a community. Within industrial settings such as chemical processing plants, oil refineries, and the like, pressure regulating valves may be used between multiple primary and secondary branch circuits in order to control various processes involving the precise control of one or more fluids, or to provide relatively steady-state pressures to, for example, air or water service branches which experience unpredictable, transitory demands. Because many end-user fluid demands require the fluid to be delivered to a secondary branch or maintained in a main branch in accordance with predetermined pressure parameters, pressure regulating valves are often employed to substantially maintain downstream or upstream pressures.

In examples described herein, a pressure regulating valve (PRV) is configured to allow a flow of the fluid through the pressure regulating valve in order to substantially maintain the pressure at or near a pressure setpoint either upstream or downstream of the pressure regulating valve. For example, for downstream pressure control, the PRV may be configured to receive a higher pressure fluid at an inlet of the pressure regulating valve, reduce the pressure of the fluid as it flows through the valve using a restricting element (e.g., a valve disc), and provide a reduced pressure fluid to a fluid circuit in fluid communication with the pressure regulating valve outlet. The PRV may be configured such that the amount of pressure reduction caused by the restricting element is variable, based on a pressure setpoint. For upstream pressure control, the PRV may be configured to receive a fluid at an inlet of the pressure regulating valve from a fluid circuit and reduce the pressure of the fluid circuit by at least providing a fluid discharge path from the fluid circuit. The flow area of the fluid discharge path may be controlled by a restricting element. The pressure regulating valve may be configured such that the amount of fluid discharged is dependent in part on a position of the restricting element, and the position of the restricting element may be variable and based on a pressure setpoint.

In examples described herein, a PRV is configured to control a fluid pressure in a fluid circuit by at least controlling a pressure in a pressure chamber, which affects the size of an area through which fluid flows through the pressure regulating valve. This area may be referred to herein as a flow area. The size (e.g., volume) of the flow area affects the fluid pressure in the fluid circuit. Thus, the PRV is configured to control the pressure in the fluid circuit by at least modifying the pressure in the pressure chamber. In some examples, the PRV includes a controller configured to modify the pressure in the pressure chamber by at least controlling a compressor to increase the pressure in the pressure chamber and by at least controlling a vent valve to decrease the pressure in the pressure chamber. In some examples, increasing the pressure in the pressure chamber decreases the size of the flow area, which increases the fluid pressure through the PRV, and decreasing the pressure in the pressure chamber increases the size of the flow area, which decreases the fluid pressure through the PRV.

In some cases, the PRV may be a normally open valve employed to substantially maintain a downstream pressure. The PRV may be configured to operate toward or into a closed position (e.g., by at least decreasing the volume of the flow area) as the downstream pressure increases, and operate toward or into an open position (e.g., by at least increasing the volume of the flow area) as the downstream pressure decreases. In this manner, the PRV may be configured to respond to downstream pressure. Decreasing downstream pressures may be indicative of an increase in demand, prompting the PRV to operate toward or into an open position to allow more flow to a downstream branch circuit. On the other hand, increasing downstream pressures may be indicative of a decrease in demand, prompting the PRV to operate toward or into a closed position to provide less flow to the downstream branch circuit. By treating downstream pressure as a proxy for demand in this manner, the PRV may substantially match the fluid supply from a main circuit to the fluid demand generated in the branch circuit, while substantially maintaining a set pressure downstream of the PRV.

In some cases, the PRV may be a normally closed valve employed to substantially maintain an upstream pressure (e.g., a back-pressure regulator (BPR)). The PRV may be configured to travel in an opening direction as the upstream pressure increases, and travel in a closing direction (or remain closed) as the upstream pressure decreases. Increasing upstream pressure may prompt the PRV to travel in the open direction, in order to allow increased flow through the flow area and decrease the upstream pressure. Decreasing downstream pressures may prompt the PRV to travel in the closing direction (or remain closed), in order to decrease flow through the flow area (or maintain substantially no flow) and increase the upstream pressure. In this manner, the PRV may be configured to substantially maintain pressure in an upstream supply branch while substantially matching demand from fluid loads drawing from the supply branch.

Some PRVs include a restricting element configured to help control flow from a higher pressure main circuit to a lower pressure branch circuit. The restricting element may comprise a valve member serving as a movable obstruction within a flow area of the PRV valve. The restricting element may comprise a valve disc, a valve spool, and/or some other movable obstruction which acts in combination with other components of the valve to provide a flow area. A fluid flowing through the PRV experiences a pressure decrease (e.g., head loss) as it proceeds through the PRV flow area due at least in part to the obstructing restricting element. The PRV may translate the restricting element to alter the spatial and/or obstruction characteristics of the flow area, which may alter the pressure loss experienced by the fluid as it travels through the PRV. Control of this pressure drop through the PRV allows control of a downstream or upstream pressure when the pressure regulating valve bridges a higher pressure main circuit and a lower pressure branch circuit. The restricting element generating the fluid pressure loss may be, for example, a poppet valve, a needle valve, a gate valve, a globe valve, spool valve, or some other mechanism or combination of mechanisms. The restricting element may be a double-ported valve.

A PRV may further include a sensing element configured to translate the restricting element, in order to vary a pressure drop and/or a flow area as a fluid flows through the pressure regulating valve. The sensing element may be, for example, a diaphragm or piston mechanically coupled to the restricting element, such that movement of the diaphragm or piston generates a translation of the restricting element. The PRV may be configured such that changes in an upstream or downstream pressure cause the sensing element to influence the restricting element and alter the flow area of the pressure regulating in a specific manner. For example, the PRV may be configured such that, when downstream pressure increases, the sensing element translates the restricting element to decrease the flow area of the PRV and consequently increase the pressure loss of a fluid flowing through the flow area, in order to cause a decrease in the downstream pressure. The PRV may be configured such that, when downstream pressure decreases, the sensing element translates the restricting element to increase the flow area of the PRV and consequently decrease the pressure loss of a fluid flowing through the flow area, in order to cause an increase in the downstream pressure. In some examples—such as when the PRV acts as a BPR—the PRV may be configured such that when an upstream pressure increases, the sensing element translates the restricting element to increase the flow area of the PRV and consequently decrease the upstream pressure.

In some examples, the degree of movement of the sensing element in response to changes in the upstream of downstream pressure may be influenced by a dome having a pressure chamber. The pressure chamber may hold a gas at a specific gas pressure, and be configured such that the gas pressure acts on one side of the sensing element. Adjustments to the gas pressure alter the degree of movement the sensing element experiences in response to changes in an upstream or downstream pressure, and allows the PRV to control the pressure setpoint around which the PRV operates. The PRV may include a compressor in fluid communication with the pressure chamber to increase a pressure in the pressure chamber, and may include a vent valve in fluid communication with the pressure chamber to decrease a pressure in the pressure chamber. The PRV may include a controller configured to cause the compressor and/or the vent valve to adjust the pressure in the pressure chamber, to enable the controller to direct changes in setpoint pressures.

In some examples, the PRV may be configured to receive a fluid flow from an upstream fluid branch and provide the fluid flow to a downstream branch while substantially maintaining a pressure in a downstream branch based on a current pressure setpoint. Thus, in some examples, in response to receiving a revised pressure setpoint less than the current pressure setpoint, the controller of the PRV may decrease the downstream pressure by at least controlling the compressor or the vent valve to modify the pressure in the pressure chamber in order to translate the restricting element to increase a pressure loss of the fluid flowing through the valve to the downstream branch (e.g., translate the restricting element in a closing direction). In addition, in response to receiving a revised pressure setpoint greater than the current pressure setpoint, the controller is configured to increase the downstream pressure by at least controlling the compressor or the vent valve to modify the pressure in the pressure chamber to translate the restricting element to decrease a pressure loss of the fluid flowing through the valve to the downstream branch (e.g., translate the restricting element in an opening direction).

In some examples, the PRV may be configured to act as a back-pressure regulator and substantially maintain a pressure in fluid branch upstream of the PRV based on a current pressure setpoint. Thus, in some examples, in response to receiving a revised pressure setpoint less than the current pressure setpoint, the controller of the PRV decreases the upstream pressure by at least controlling the compressor or the vent valve to modify the pressure in the pressure chamber in order to translate the restricting element to increase the flow area of the PRV and increase the flow from the upstream branch. In addition, in response to receiving a revised pressure setpoint greater than the current pressure setpoint, the controller of the PRV decreases the upstream pressure by at least controlling the compressor or the vent valve to modify the pressure in the pressure chamber in order to translate the restricting element to decrease the flow area of the PRV and decrease or even cease (in some examples) flow from the upstream branch.

In some examples, a PRV may be configured to operate around a specific pressure setpoint. The PRV may be configured to substantially maintain a setpoint pressure in a fluid branch downstream of the PRV, or may be configured to substantially maintain a setpoint pressure in a fluid branch upstream of the PRV, such as with the aid of a sensing element and a restricting element.

Here and elsewhere, "downstream" means the direction of a fluid flowing from a higher pressure area to a lower pressure area. "Upstream" denotes a direction opposite the downstream direction. For example, when a PRV is configured to provide flow from a higher pressure main circuit to a lower pressure branch circuit, a fluid flowing from the higher pressure main circuit to the lower pressure branch circuit flows in the downstream direction. The direction opposite the direction of fluid flow from the higher pressure main circuit to the lower pressure branch circuit is the upstream direction.

FIG. 1 illustrates an example fluid system 100 including a main circuit 102 configured to provide a fluid (gas or liquid) to branch circuits 108, 118, and 128. Branch circuit 108 is configured to be supplied with a fluid from main circuit 102 via PRV 104, and configured to provide the fluid to fluid load 110. PRV 104 is configured to receive higher pressure fluid from, for example, main circuit 102, and supply the fluid at a lower pressure to branch circuit 108. Branch circuit 108 is configured to provide the lower pressure fluid to fluid load 110.

Fluid load 110 may be a load intended to receive fluid at some secondary pressure below the supply pressure of the fluid provided by main circuit 102. For example, fluid load 110 might be a water or air connection intended to operate under relatively constant or transitory demand, where equipment and/or safety considerations require that the air or water be provided at a lower pressure than that present within main circuit 102. Fluid load 110 might be, for example, a primary residential water connection, a water supply to a specific household appliance such as a water heater, a service air connection for the operation of air-driven tools, a pneumatic supply to some pneumatically operated system, a cooling water supply to specific equipment, or some other load intended to operate at pressures lower than that supplied by main circuit 102.

PRV 104 is configured to receive the higher pressure fluid from main circuit 102 and provide the fluid at a lower pressure to branch circuit 108. PRV 104 is configured to operate in accordance with a specific pressure setpoint, in order to maintain a substantially constant secondary pressure in branch circuit 108 as the main supply pressure of main circuit 102 varies and/or the fluid demand from fluid load 110 varies. For example, PRV 104 may be configured to maintain a secondary pressure in branch circuit 108 within 1% to about 30% of a setpoint pressure, such as within 30% of the pressure setpoint, within 20% of the pressure setpoint, within 10% of the setpoint pressure, within 5% of the setpoint pressure, or within 1% of the setpoint pressure.

PRV 104 may comprise a gas loaded, spring loaded, or gas and spring loaded dome, such as dome 105. Dome 105 may impart a pressure and/or force to a sensing element (not shown in FIG. 1) within PRV 104. The sensing element may be configured such that some portion of the fluid flow proceeding through PRV 104 imparts a pressure generally counter-acting the pressure and/or force imparted by dome 105. The sensing element may be configured to translate in response to changes in the dome pressure and/or force, changes in the counter-acting pressure of the fluid flow through PRV 104, or changes to both. The translation of the sensing element may alter the fluid flow characteristics of the flow through PRV 104, and act to increase or decrease a pressure of branch circuit 108. Dome 105 may be configured such that the pressure and/or force imparted by dome 105 is adjustable. Adjustments to the pressure and/or force imparted by dome 105 may thus be utilized as a control for the pressure setpoint of branch circuit 108. For example, the force applied by dome 105 is configured to be adjusted by increasing or decreasing a gas pressure with a pressure chamber comprising dome 105. As discussed below, in some examples, PRV 104 includes a compressor and a vent valve, and a controller of PRV 104 is configured to control the compressor to increase a gas pressure in the pressure chamber of dome 105, and control a vent valve to reduce a gas pressure in the pressure chamber of dome 105. The controller of a PRV, as described herein, can be located within a housing of the PRV or can be separate from the housing of the PRV. For example, the controller of PRV 104 can be located within a housing of PRV 104 or be positioned elsewhere within system 100. Further, although controllers of individual PRVs of system 100 are described herein, in some examples, one controller can control multiple PRVs. That is, system 100 can include one or more controllers configured to provide the control of PRVs described herein.

Pressure sensor 106 is configured to provide an indication of a pressure at a location within branch circuit 108, a pressure at an outlet of PRV 104, or a pressure at some other location in fluid communication with branch circuit 108. For example, pressure sensor 106, as well as other pressure sensors described herein, can include any suitable pressure sensing circuitry and other structure configured to generate a signal indicative of the pressure at the sensing location. In some examples, a controller (e.g., of PRV 104) can adjust the dome 105 of PRV 104 based on the indication provided by pressure sensor 106. For example, pressure sensor 106 may indicate a first pressure of branch circuit 108. In order to substantially establish a second (higher or lower) pressure in branch circuit 108, the controller can adjust the gas pressure within a pressure chamber comprising dome 105 until pressure sensor 106 substantially indicates the second pressure.

System 100 may include additional branch circuits, such as branch circuit 118. Branch circuit 118 is configured to receive fluid from main circuit 102 via PRV 114 and provide fluid to fluid load 120. PRV 114 and fluid load 120 may be similar to PRV 104 and fluid load 110. For example, fluid load 120 may be a load intended to receive fluid at some particular pressure below the supply pressure of the fluid provided by main circuit 102, and PRV 114 may be configured to substantially maintain the particular pressure in branch circuit 118. The particular pressure based on fluid load 120 may be greater, less than, or equal to the predetermined pressure based on fluid load 110. Correspondingly, a particular pressure setpoint of PRV 114 may be greater, less than, or equal to the specific pressure setpoint of PRV 104. PRV 114 may be configured to operate similarly to PRV 104, such that PRV 114 may substantially maintain the particular pressure within branch circuit 118 as the main supply pressure of main circuit 102 and/or the fluid demand from fluid load 120 varies. PRV 114 may comprise dome 115, and pressure sensor 116, which is configured to generate an indication of a pressure at a location within branch circuit 118, a pressure at an outlet of PRV 114, or a pressure at some other location in fluid communication with branch circuit 118.

System 100 may further include a branch circuit 128. Branch circuit 128 may receive fluid from main circuit 102 via PRV 124. PRV 124 may be configured to operate similarly to PRV 104 and PRV 114, such that PRV 124 may substantially maintain an established pressure within branch circuit 128 as the main supply pressure of main circuit 102 and/or downstream fluid demands vary. PRV 124 may comprise dome 125, and pressure sensor 126, which is configured to generate an indication of a pressure at a location within branch circuit 128, a pressure at an outlet of PRV 124, or a pressure at some other location in fluid communication with branch circuit 128.

PRV 124 may act as a primary pressure regulator and provide fluid at an established pressure to secondary pressure regulator 130, secondary pressure regulator 136, and secondary pressure regulator 142. Secondary pressure regulator 130 may be configured to further reduce the pressure of the fluid within branch circuit 128 and provide fluid to tertiary branch 132 and fluid load 134. Secondary pressure regulator 136 may be configured to further reduce the pressure of the fluid within branch circuit 128 and provide the fluid to tertiary branch 138 and fluid load 140. Secondary pressure regulator 142 may be configured to further reduce the pressure of the fluid within branch circuit 128 and provide the fluid to tertiary branch 144 and fluid load 146. Fluid load 134, fluid load 140, and fluid load 146 may require fluid supplied at pressures less than fluid load 110 and/or fluid load 120, and secondary regulator 130, secondary regulator 136, and secondary regulator 142 may be provided in order accomplish the additional pressure reduction in a more accurate manner based on, for example, a droop or other inaccuracy which may occur during operation of PRV 124. For example, PRV 124 might be used to reduce a main supply pressure of about 500 psi (4.35 megapascal) in main circuit 102 to a secondary pressure of about 100 psi (689 kilopascal (kPa)) in branch circuit 128, and secondary pressure regulators 130, 136, 142 might be used to reduce the secondary pressure of about 100 psi (689 kPa) in branch circuit 128 to a pressure less than about 25 psi (172 kPa).

In some examples, system 100 includes one or more additional PRVs, such as PRV 150, to act as a back-pressure regulator and operate in accordance with a specific pressure setpoint, in order to maintain a substantially constant main supply pressure of main circuit 102 as the fluid demands of PRV 104, PRV 114, and PRV 124 vary. PRV 150 may be configured to provide a relieving flow from main circuit 102 via, for example, fluid conduit 164 when a pressure of main circuit 102 exceeds a pressure setpoint. For example, PRV 150 may be configured to open or further open when the main supply pressure of main circuit 102 equals or exceeds a setpoint value, in order to provide a relieving flow from main circuit 102 via fluid conduit 164. PRV 150 may be configured to close when the main supply pressure of main circuit 102 equals or is below the setpoint valve, and/or further close as the main supply pressure of main circuit 102 approaches the setpoint value from an over pressure condition in main circuit 102.

In some examples, PRV 150 comprises a gas loaded, spring loaded, or gas and spring loaded dome, such as dome 151. Dome 151 may impart a pressure and/or force to a sensing element (not shown) within PRV 150. The sensing element may be configured such that the pressure of main circuit 102 (upstream of PRV 150) counter-acts the pressure and/or force imparted by dome 151. The sensing element may be configured to translate in response to changes in the dome pressure and/or force, changes in the pressure of main circuit 102, or changes to both. PRV 150 may be configured such that the pressure and/or force imparted by dome 151 is adjustable. Adjustments to the pressure and/or force imparted by dome 151 may thus be utilized as a control for the pressure setpoint of branch circuit 108. For example, a controller, e.g., of PRV 150, can adjust a pressure provided by dome 151 by increasing or decreasing a gas pressure with a pressure chamber comprising dome 151.

Pressure sensor 152 is configured to generate an indication of a pressure at a location within main circuit 102, a pressure at an inlet of PRV 151, or a pressure at some other location in fluid communication with main circuit 102. The controller can adjust dome 151 of PRV 150 based on the indication provided by pressure sensor 152. For example, pressure sensor 152 may indicate a first pressure of main circuit 102. In order to substantially establish a second (higher or lower) pressure in main circuit 102, the controller can adjust a gas pressure within a pressure chamber comprising dome 151 until pressure sensor 152 substantially indicates the second pressure.

As discussed, pressure regulating valves such as some or all of PRV 104, PRV 114, PRV 124, PRV 130, PRV 136, PRV 142, and PRV 150 may include a respective restricting element in order to control flow from a higher pressure main circuit such as main circuit 102 to a lower pressure branch circuit or fluid conduit. The restricting element may comprise a valve member serving as a movable obstruction within a flow area of the PRV. The restricting element may comprise a valve disc, a valve spool, and/or some other movable obstruction which acts in combination with other components of the PRV to provide the flow area. A fluid flowing through the PRV from a PRV inlet to a PRV outlet experiences a pressure decrease (e.g., head loss) as it proceeds through the flow area, due at least in part to the obstruction in the flow area provided by the restricting element. Movement of the restricting element, which can be referred to herein as PRV travel in some examples, may alter the obstruction provided by the restricting element, which may alter the pressure loss experienced by the fluid as it travels through the pressure regulating valve. The alteration of the restricting element may include a restricting element position corresponding to fully open, fully closed, and/or any position between fully open and fully closed. Control of the pressure drop through the valve using the restricting element allows control of a downstream or upstream pressure when the pressure regulating valve bridges a higher pressure main circuit and a lower pressure branch circuit.

Although PRVs 104, 114, 124, 130, 136, 142, 150, are shown in FIG. 1, system 100 may include any suitable number of pressure regulating valves, and any number of main, branch, or otherwise designated fluid branches. The pressure regulating valves may be configured to receive a higher pressure fluid from a first branch and provide fluid to a second branch while substantially maintaining a pressure in the second branch. In some examples, some or all of the PRVs may be configured to as a back-pressure regulator and discharge fluid from a first branch to a second branch and/or fluid path to substantially maintain a pressure in the first branch. A PRV may supply any number of fluid loads and any number of fluid branches. For example, PRV 104 may supply one or more fluid loads in addition to fluid load 110 and one or more fluid branches in addition to branch circuit 108. A main, branch, or otherwise designated fluid branch may receive fluid from any number of upstream pressure regulating valves. Any number of pressure regulating valves may operate in in series or in parallel with any quantity of pressure regulating valves.

Figure 2:
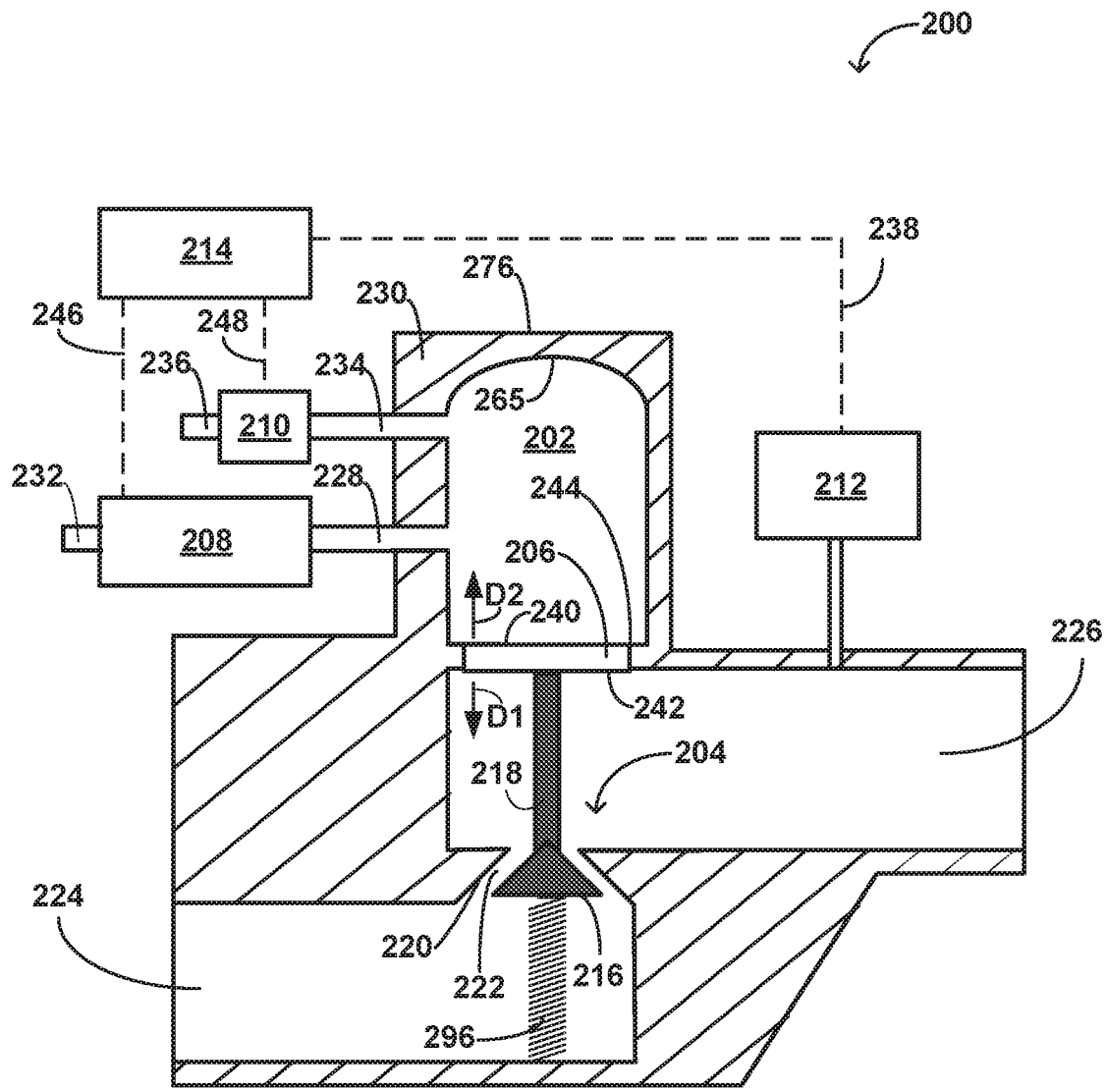
FIG. 2 is a conceptual diagram illustrating an example pressure regulating valve including a controller and an outlet pressure sensor.

FIG. 2 illustrates an example PRV 200. PRV 200 comprises PRV inlet 224 and PRV outlet 226 and is configured to provide a flow path for a fluid between PRV inlet 224 and PRV outlet 226. In some examples, PRV 200 is configured to receive a higher pressure fluid at PRV inlet 224 and regulate the fluid flow in order to provide fluid at a lower pressure at PRV outlet 226. For example, PRV 200 may be configured receive a higher pressure fluid from main circuit 102 and provide a lower pressure fluid to branch circuit 108, branch circuit 118, or branch circuit 128 (FIG. 1). Thus, PRV 200 is an example of any of the PRVs described with reference to FIG. 1 (e.g., PRV 104, PRV 114, PRV 124, PRV 130, PRV 136, PRV 142, and/or PRV 150)

In the example shown in FIG. 2, PRV further comprises restricting element 204, valve disc 216, valve stem 218, valve seat 220, sensing element 206 defining first side 240, second side 242, and perimeter 244, pressure chamber 202, housing 230 having a housing exterior 276 and a boundary 265, controller 214, pressure sensor 212, compressor 208, compressor conduit 228, compressor inlet 232, vent valve 210, vent valve outlet 236, vent conduit 234, sensor communication link 238, compressor communication link 246, vent valve communication link 248, and spring element 296.

The flow path between PRV inlet 224 and PRV outlet 226 may include a flow area 222 within PRV 200, with a geometry of flow area 222 dependent in part on a restricting element 204. Restricting element 204 may comprise, for example, valve stem 218 mechanically coupled to valve disc 216. Flow area 222 is defined by any suitable structures. In some examples, as shown in FIG. 2, flow area 222 is at least partially bounded by valve disc 216 and valve seat 220. PRV 200 is configured to allow for restricting element 204 to translate and alter flow area 222. The alteration of flow area 222 may alter a pressure drop a fluid flow experiences between PRV inlet 224 and PRV outlet 226, allowing for the regulation of a fluid flow between PRV inlet 224 and PRV outlet 226.

PRV 200 further includes a sensing element 206. Sensing element 206 is configured to influence the translation of restricting element 204. For example, sensing element 206 may be mechanically coupled to restricting element 204. Sensing element 206 includes a first side 240 and a second side 242, and may be configured such that sensing element 206 experiences motion based on a differential pressure between first side 240 and second side 242. The differential pressure may arise from a first pressure acting on first side 240 and a second side acting on second side 242. For example, sensing element 206 may comprise a diaphragm or a piston having a first side and a second side. Sensing element 206 may define a perimeter 244 surrounding a portion of sensing element 206. Sensing element 206 may be mechanically coupled and/or fixably attached to housing 230 of PRV 200 around all or some part of perimeter 244. For example, sensing element 206 may be a particular diaphragm defining a perimeter 244 and fixably attached around the entirety of perimeter 244. Sensing element may be a piston with perimeter 244 slidably translatable over some portion of housing 230.

In some examples, sensing element 206 provides a substantially pressure-tight barrier between pressure chamber 202 of PRV 200 and some other portion of PRV 200, where the other portion of PRV 200 is configured to experience a pressure dependent on a fluid flow through PRV 200. For example, sensing element 206 may provide a provide a substantially pressure-tight barrier between pressure chamber 202 and some portion of PRV 200 between and including flow area 222 and PRV outlet 226. Sensing element 206 may be configured to respond (e.g., by deflection of the diaphragm, or translation of the piston) based on a differential pressure between the pressure chamber and the portion of PRV 200.

As discussed, the differential pressure across sensing element 206 may arise from a first pressure acting on first side 240 and a second pressure acting on second side 242. In some examples, the first pressure acting on first side 240 of sensing element 206 may arise from a gas pressure within a pressure chamber 202 of PRV 200 and the second pressure acting on second side 242 of sensing element 206 may arise from a fluid flow through PRV 200. For example, the second pressure may arise from fluid communication with one or more flow sections of a fluid flow between and including flow area 222 and PRV outlet 226, where the one or more flow sections are separated from pressure chamber 202 by the substantially pressure-tight barrier provided by sensing element 206. The second pressure may arise from flow sections which encounter second side 242 of sensing element 206, as well as from flow sections which encounter valve disc 216. Hence, in some examples, the differential pressure experienced across sensing element 206 is dependent on both a gas pressure within pressure chamber 202 and the fluid flow pressure at one or more flow sections of a fluid flowing from flow area 222 in the direction of PRV outlet 226.

In some examples, PRV 200 is configured to adjust flow area 222 (in response to changes in a downstream pressure. Adjusting flow area 222 adjusts a pressure drop of fluid flow through flow area 222. "Adjustment" to flow area 222 can refer to the adjustment to a size of flow area, such as an adjustment to a volume of flow area 222. The downstream pressure may be a pressure at PRV outlet 226, or some other flow section downstream of flow area 222. For example, with a substantially constant gas pressure in pressure chamber 202, an increase in the downstream pressure may increase the second pressure acting on second side 242, and cause sensing element 206 to reposition restricting element 204 in a manner that increases a pressure drop of a fluid as it flows through flow area 222 (e.g., sensing element 206 may reposition restricting element 204 in a closing direction such as D2 to decrease flow area 222). The increased pressure loss through flow area 222 may cause a decrease in the downstream pressure at, for example, PRV outlet 226, or some other flow section downstream of flow area 222.

Alternatively, with a substantially constant gas pressure in pressure chamber 202, a decrease in downstream pressure may decrease the second pressure acting on second side 242, and cause sensing element 206 to reposition restricting element 204 in a manner that decreases a pressure drop of a fluid as it flows through flow area 222 (e.g., sensing element 206 may reposition restricting element 204 in an opening direction such as D1 to increase flow area 222). The decreased pressure loss through flow area 222 may cause an increase in the downstream pressure at, for example, PRV outlet 226, or some other flow section downstream of flow area 222. Hence, the differential pressure experienced across sensing element 206, and the subsequent response of PRV 200, may be dependent on both a gas pressure within pressure chamber 202 and a fluid flow pressure at one or more flow sections downstream of flow area 222.

By adjusting the gas pressure in pressure chamber 202 (i.e., the first pressure acting on first side 240 of sensing element 206), PRV 200 may be configured such that sensing element 206 operates around a specific pressure setpoint. Increases in downstream pressure above the setpoint may cause sensing element 206 to translate restricting element 204 to decrease flow area 222 and decrease the downstream pressure. Decreases in downstream pressure below the setpoint may cause sensing element 206 to translate restricting element 204 to increase flow area 222 and increase the downstream pressure.

In this manner PRV 200 may regulate a flow from PRV inlet 224 to PRV outlet 226 to substantially maintain a fluid pressure downstream of flow area 222, based on a differential pressure across sensing element 206. For example, PRV 200 may maintain the downstream fluid pressure within at least 1% to about 30% of a setpoint pressure, such as at within about 1%, 5%, 10%, 20%, or 30% of the setpoint pressure.

As discussed, the differential pressure across sensing element 206 may arise from the first pressure acting on first side 240 (exerted at least in part by the gas pressure in pressure chamber 202) and the second pressure acting on second side 242 (exerted at least in part by one or more flow sections of the fluid flow between PRV inlet 224 and PRV outlet 226). Consequently, PRV 200 may be configured such that the fluid pressure substantially maintained at PRV outlet 226 can be adjusted by adjusting the gas pressure in pressure chamber 202.

Pressure chamber 202 is defined or surrounded at least in part by housing 230 of PRV 200, which can be formed from any suitable material, such as, but not limited to metals, polymers, ceramics, or combinations thereof. Pressure chamber 202 may comprise a volume surrounded by a substantially gas-tight (e.g., gas-tight or gas-tight to the extent permitted by manufacturing tolerances) boundary, with the volume in fluid communication with sensing element 206. The volume may have any suitable shape. In examples, the volume may be partially enclosed by a dome-shaped boundary, such as boundary 265. Exterior 276 of housing 230 may be fluidly isolated from the gas-tight boundary of pressure chamber 202

Pressure chamber 202 is configured to be isolated from flow pressures experienced by components of PRV 200 which fluidly communicate with a fluid flow from PRV inlet 224 to PRV outlet 226, in order to substantially maintain the gas pressure of a gas present within pressure chamber 202. For example, when pressure chamber 202 holds a gas at a gas pressure, pressure chamber 202 may be isolated from, for example, flow pressures at PRV inlet 224 and PRV outlet 226, such that pressure chamber 202 may substantially maintain the gas pressure despite variations in the flow pressure. In examples, pressure chamber 202 may be isolated from valve inlet 224, flow area 222, valve seat 220, restricting element 204, second side 242 of sensing element 206, and PRV outlet 226. Sensing element 206 may be configured to such that first side 240 provides some portion of the pressure isolation between pressure chamber 202 and valve inlet 224, flow area 222, valve seat 220, restricting element 204, second side 242 of sensing element 206, and PRV outlet 226.

PRV 200 is configured to establish a pressure setpoint using a gas pressure in a pressure chamber such as pressure chamber 202. PRV 200 includes a controller 214 configured to control (e.g., by increasing or decreasing) the gas pressure within pressure chamber 202, in order to adjust the pressure setpoint within a system supplied by PRV 200. Such adjustments may be beneficial in a variety of circumstances. For example, PRV 200 may be configured to receive a fluid from a main branch at PRV inlet 224 and provide the fluid at a lower pressure to a secondary branch via PRV outlet 226. The primary branch may be, for example, a municipal water supply, while the secondary branch might comprise a portion of a water distribution system in a residence. It might be advantageous to vary the pressure setpoint of the residential distribution system based on, for example, a time of day. Controller 214 might act to increase the pressure setpoint during daylight hours as opposed to night time hours, if higher water demand is more likely to be initiated during the daylight hours due to occupant activity. Increasing the pressure setpoint during anticipated periods of higher demand might serve to lessen the impact of pressure transients throughout the system when multiple water loads are initiated substantially simultaneously. In an industrial type setting, controller 214 might act to establish certain pressure setpoints at certain times of day based on fluid loads anticipated from scheduled operations, historical data, or other indicators of anticipated demand.

Varying the pressure setpoint based on the actuation of specific fluid loads and the anticipated demand of the load may also provide one or more advantages in some examples. For example, controller 214 might receive an indication that a specific fluid load has been initiated and establish the pressure setpoint based on that specific fluid load. For example, in a residential water system, controller 214 might establish a first setpoint when a potentially higher demand load such as a washing machine is initiated, and establish a second setpoint when a potentially lower demand load such as a kitchen faucet is initiated. In an industrial setting, controller 214 might establish pressure setpoints based on the initiation of one or more specific processes. Matching a fluid pressure to a specific demand may generate a degree of fluid conservation by somewhat avoiding situations where fluid may be supplied to the specific load at a greater rate than the specific load requires.

Controller 214 is configured to establish a pressure setpoint by increasing or decreasing a gas pressure in pressure chamber 202. In some examples, PRV 200 comprises a compressor 208 configured to increase a gas pressure inside pressure chamber 202, e.g., by introducing gas into pressure chamber 202, and a vent valve 210 configured to decrease a gas pressure inside pressure chamber, e.g., by defining a pathway through which gas may leave pressure chamber 202.

In some examples, controller 214 communicates with compressor 208 and directs (e.g., controls directly or indirectly) compressor 208 to increase the gas pressure in pressure chamber 202 in order to adjust the pressure setpoint. Controller 214 may communicate with compressor 208 using, for example, compressor communication link 246. Controller 214 may communicate with vent valve 210 and direct vent valve 210 to establish a valve position that decreases the gas pressure in pressure chamber 202 in order to adjust the pressure setpoint. Controller 214 may communicate with vent valve 210 using, for example, vent valve communication link 248. Compressor communication link 246 and/or vent valve communication link 248 may be hard-line and/or wireless communications links. In some examples, vent valve communication link 248 and/or compressor communication link 246 may comprise some portion of controller 214. In some examples, vent valve communication link 248 and/or compressor communication link 246 comprise a wired connection, a wireless Internet connection, a direct wireless connection such as wireless LAN, Bluetooth™, Wi-Fi™, and/or an infrared connection. Vent valve communication link 248 and/or compressor communication link 246 may utilize any wireless or remote communication protocol.

Controller 214 includes controller circuitry and can comprise any suitable arrangement of hardware, software, firmware, or any combination thereof, to perform the techniques attributed to controller 214 herein. For example, controller 214 may include any one or more microprocessors, digital signal processors (DSPs), application specific integrated circuits (ASICs), field programmable gate arrays (FPGAs), or any other equivalent integrated or discrete logic circuitry, as well as any combinations of such components.

Compressor 208 is configured to establish fluid communication with pressure chamber 202. For example, in the example shown in FIG. 2, compressor 208 is configured to establish fluid communication with pressure chamber 202 through compressor conduit 228 of housing 230 and/or boundary 265. Compressor 208 is configured to draw a gas through compressor inlet 232, increase a pressure of the gas, and provide the gas via compressor conduit 228 to pressure chamber 202. Compressor 208 may be a centrifugal compressor, a positive displacement compressor, or any other type of device which is configured to draw gas at an inlet and provide a higher pressure flow of the gas at an outlet. Compressor 208 may be configured to operate using an alternating current (AC) input power, direct current (DC) input power, or a combination. In examples, compressor 208 comprise a Brushless DC Motor (BLDC). In some examples, compressor 208 may include processing circuitry configured to control components of compressor 208 in response to a received electrical or electronic communication. The processing circuitry can be provided by controller 214 or may be separate from controller 214. Compressor 208 may be configured to provide communications to other devices in data communication with compressor 208. In examples, compressor 208 may be configured to establish a pressure barrier between pressure chamber 202 and compressor inlet 232.

In the example shown in FIG. 2, PRV 200 includes a vent valve 210 configured to establish fluid communication with pressure chamber 202. For example, at FIG. 2, vent valve 210 may establish fluid communication with pressure chamber 202 through vent conduit 234 of housing 230. Vent valve 210 comprises vent valve outlet 236 and is configured to provide fluid communication between pressure chamber 202 and vent valve outlet 236. Vent valve 210 may act to provide a fluid flow path to reduce the pressure Pc of pressure chamber 202. In some examples, controller 214 is configured to communicate with vent valve 210 and control the operations of vent valve 210. For example, controller 214 may communicate with vent valve 210 via vent valve communication link 248.

In examples, vent valve 210 is configured to establish a pressure barrier between pressure chamber 202 and vent valve outlet 236. Vent valve 210 may be a globe valve, a gate valve, a spool valve, a poppet valve, or any other type of valve mechanism which may be configured to control a flow path from an inlet to an outlet. In some examples, vent valve 210 may be a remotely actuated valve. In some examples, vent valve 210 comprises a solenoid actuator configured to influence the position of a plunger mechanically coupled to a flow restricting element, such as a valve disc. Vent valve 210 may configured to translate a flow restricting element based on a supply of a control fluid. For example, vent valve 210 may be a hydraulically or pneumatically operated valve. Vent valve 210 may include processing circuitry configured to control components of vent valve 210 in response to a received electrical or electronic communication. The processing circuitry can be provided by controller 214 or may be separate from controller 214. Vent valve 210 may be configured to provide communications to other devices in data communication with compressor vent valve 210. Controller 214 may direct vent valve 210 to fully or partially open and provide fluid communication between pressure chamber 202 and vent valve outlet 236, and may direct vent valve 210 to fully or partially close and cease or reduce a fluid communication between pressure chamber 202 and vent valve outlet 236.

To control the pressure within pressure chamber 202, controller 214 may, at various times, conduct one or more of: direct compressor 208 to commence charging a gas into pressure chamber 202, direct compressor 208 to cease charging the gas into pressure chamber 202, direct vent valve 210 to fully or partially open and provide fluid communication between pressure chamber 202 and vent valve outlet 236, and direct vent valve 210 to fully or partially close and cease or reduce a fluid communication between pressure chamber 202 and vent valve outlet 236. As discussed below, the action selected by controller 214 for compressor 208 and vent valve 210 may depend on whether controller 214 is increasing or decreasing pressure within pressure chamber 202.

PRV 200 further includes a pressure sensor 212 configured to generate a signal indicative of a pressure. For example, as depicted at FIG. 2, pressure sensor 212 may be configured to generate a signal indicative of a pressure at PRV outlet 226, and/or indicative of a pressure downstream of flow area 222. Pressure sensor 212 may generate a signal as a function of a pressure imposed on some portion of pressure sensor 212. Pressure sensor 212 may be configured to use any type of force collector to sense the outlet pressure, including, for example, diaphragms, pistons, bourdon tubes, bellows, or some other collector. Pressure sensor 212 may transduce the pressure into an electrical signal using, for example, piezoresistive strain gauges, capacitors, electromagnets, optical fibers, potentiometric wipers, or other devices. Pressure sensor 212 may be configured to sense an absolute pressure or a gauge pressure. The signal indicative of the pressure generated by pressure sensor 212 may be an analog electrical signal or a digital signal. Pressure sensor 212 may include processing circuitry configured to interpret a response of the force collector and generate the signal indicative of the pressure, and/or controller 214 may include processing circuitry configured to interpret a response of the force collector and generate the signal indicative of the pressure. Pressure sensor 212 may be configured to provide communicate the signal indicative of the pressure to other devices in data communication with pressure sensor 212.

Controller 214 is configured to receive the signal indicative of the pressure from pressure sensor 212. Controller 214 may receive the signal indicative of the pressure via, for example, sensor communication link 238 between controller 214 and pressure sensor 212. Controller 214 is configured to compare the signal indicative of the pressure received from pressure sensor 212 with a pressure setpoint. The pressure setpoint may be stored in a memory of controller 214 or of another device of system 200 or communicatively coupled to controller 214. The memory may include any volatile or non-volatile media, such as a random access memory (RAM), read only memory (ROM), non-volatile RAM (NVRAM), electrically erasable programmable ROM (EEPROM), flash memory, and the like. In some examples, the memory may be internal to controller 214. In addition, in some examples, the memory or another memory may also store executable instructions for causing the one or more controllers described herein to perform the actions attributed to them.

Sensor communication link 238 may be hard-line and/or wireless communications link. Sensor communication link 238 may comprise some portion of controller 214. Sensor communication link 238 may comprise a wireless Internet connection, a direct wireless connection such as wireless LAN, Bluetooth™, Wi-Fi™, and/or an infrared connection. Sensor communication link 238 may utilize any wireless or remote communication protocol.

Based on the comparison of the indicative signal from pressure sensor 212 and the pressure setpoint, controller 214 is configured to increase or decrease a pressure in pressure chamber 202. Controller 214 may direct compressor 208 to operate such that compressor 208 draws a gas such as air into compressor inlet 232 and directs the gas into pressure chamber 202, increasing the gas pressure of pressure chamber 202. Controller 214 may control vent valve 210 and cause vent valve 210 to operate (e.g., to open) to provide fluid communication between pressure chamber 202 and an environment external to pressure chamber 202, allowing pressure chamber 202 to vent and decrease the gas pressure of pressure chamber 202.

Utilizing compressor 208 and vent valve 210, controller 214 may be configured to increase or decrease the pressure of a secondary fluid branch in fluid communication with PRV outlet 226 of PRV 200. For example, to increase or decrease a pressure in the secondary branch, controller 214 may receive or establish a revised pressure setpoint reflective of the new desired pressure. Based on a comparison of the revised setpoint and a signal indicative of the pressure provided by pressure sensor 212, controller 214 may control compressor 208 and/or vent valve 210 to increase or decrease the pressure in pressure chamber 202, causing PRV 200 to establish a configuration causing an increase or decrease of the pressure at PRV outlet 226, until a comparison of the revised setpoint and the signal indicative of the pressure provided by pressure sensor 212 indicates the pressure in pressure chamber 202 is satisfactory (e.g., within a predetermined range of the pressure setpoint, such as within 5% to 30%, such as within 5%, 10%, 20%, or 30% of the pressure setpoint in various examples).

In some examples, controller 214 may be provided with one or more pressure setpoints, e.g., a revised setpoint, via a communication from another device or via a user interface of controller 214. The user interface can have any suitable configuration. For example, the user interface can include a button or keypad, a speaker configured to receive voice commands from a user, a display, such as a liquid crystal (LCD), light-emitting diode (LED), or organic light-emitting diode (OLED). In some examples the display may be a touch screen. The user interface is configured to receive user input, e.g., in the form of pressing one or more buttons on a keypad or via a touch screen, which may be user input selecting a desired pressure setpoint, for example. In some examples, the user interface is also configured to display information, such as one or more pressure setpoints (e.g., the current setpoint being used by controller 214 to control PRV 200 or one or more predetermined pressure setpoints from which the user can select to input a desired pressure setpoint).

In some examples, controller 214 may be configured to establish a desired setpoint based on a particular criteria. For example, controller 214 may be configured to establish a revised setpoint based on a time of day, a scheduled operation requiring or anticipated to require a particular fluid demand from PRV 200, and/or the actuation of a specific fluid load supplied by PRV 200.

In some examples, PRV 200 may be a reverse-seated valve. PRV 200 may be configured such that a movement of sensing element 206 in a direction toward valve seat 220 (e.g., in the direction D1) causes restricting element 204 to translate and increase flow area 222. The movement of sensing element 206 toward valve seat 220 may be caused by a decrease in the pressure of a fluid section within PRV 200. The fluid section may be a fluid section downstream of flow area 222. The movement of sensing element 206 toward valve seat 220 may be caused by an increase in the pressure of a gas within pressure chamber 202. Controller 214 may increase the pressure of the gas within pressure chamber 202 causing sensing element to move in a direction toward valve seat 220 (e.g., in the direction D1) and increase flow area 222. The increase in flow area 222 may reduce the pressure drop of a fluid flowing through flow area 222, increasing the pressure at PRV outlet 226.

PRV 200 may be configured such that a movement of sensing element 206 in a direction away from valve seat 220 (e.g., in the direction D2) causes restricting element 204 to translate and decrease flow area 222. The movement of sensing element 206 away from valve seat 220 may be caused by an increase in the pressure of a fluid section within PRV 200. The fluid section may be a fluid section downstream of flow area 222. The movement of sensing element 206 away from valve seat 220 may be caused by a decrease in the pressure of a gas within pressure chamber 202. Controller 214 may decrease the pressure of the gas within pressure chamber 204 causing sensing element to move in a direction away from valve seat 220 (e.g., in the direction D2) and decrease flow area 222. The decrease in flow area 222 may increase the pressure drop of a fluid flowing through flow area 222, decreasing the pressure at PRV outlet 226.

Restricting element 204 includes any suitable structure and is configured to translate in directions D1 and D2 using any suitable structure. In some examples, PRV 200 includes a spring element 296 configured to translate restricting element 204 to close PRV 200. Spring element 296 may be configured to transmit a force to restricting element 204 in a direction which biases restricting element 204 to reduce (or eliminate in some examples) flow area 222. The biasing force transmitted by spring element 296 to restricting element 204 may be in opposition to a force transmitted to restricting element 204. Spring element 296 may be configured such that, if a force transmitted by sensing element 206 fails below a threshold, the biasing force transmitted by spring element 296 causes restricting element 204 to translate in a manner reducing or eliminating flow area 222 of PRV 200. Spring element 296 may be configured to be in either tension or compression as it transmits the biasing force to restricting element 204. For example, spring element 296 may be in compression and configured to transmit the biasing force to restricting 204 element by extending. As another example, spring element 296 may be in tension and configured to transmit the biasing force to restricting element 204 by contracting.

For example, FIG. 2 illustrates spring element 296 in compression between a section of PRV 200 and restricting element 204. Spring element 296 is configured to transmit a force to restricting element 204 substantially in the direction D2, biasing restricting element 204 to translate in a manner reducing or eliminating flow area 222. The biasing force transmitted by spring element 296 to restricting element 204 is in opposition to a force transmitted by sensing element 206 in the direction D1, which causes restricting element 204 to translate in a manner increasing flow area 222. Spring element 296 is configured such that, if the force transmitted by sensing element 206 in the direction D1 fails below a threshold, the biasing force transmitted by spring element 296 causes restricting element 204 to translate in a manner reducing or eliminating flow area 222 of PRV 200. For example, if controller 214 utilizes vent valve 210 to decrease the pressure in pressure chamber 202 as previously described, and the decreased pressure reduces the force transmitted by sensing element 206 in the direction D1 to below the threshold, the biasing force transmitted by spring element 296 may cause restricting element 204 to translate in a manner reducing or eliminating flow area 222 of PRV 200.

In this manner, spring element 296 may act as a shut off mechanism for PRV 200, acting to reduce or eliminate flow area 222 when controller 214 recognizes a condition under which PRV 200 should close and, in response, opens vent valve 210 to reduce the pressure in pressure chamber 202. For example, in some examples, controller 214 may receive a leak signal from a leak detection system monitoring a fluid branch downstream of PRV 200. Controller 214 may be configured such that, in response to receiving the leak signal, controller 214 causes vent valve 210 to open and reduce the pressure in pressure chamber 202 to a level where spring element 296 causes restricting element 204 to translate and close PRV 200, thereby eliminating (to the extent possibly by the fluid seals of PRV 200) fluid flow through PRV.

In examples, controller 214 may cause vent valve 210 to open and equalize the pressure in pressure chamber 202 with an atmosphere surrounding PRV 200 in response to receiving a leak signal from a leak detection system. For example, PRV 200 may be PRV 114 (FIG. 1). A leak detection system 182 (FIG. 1) might be configured to detect leakage from branch circuit 118 and controller 214 of PRV 114 may be configured to receive a leak signal from leak detection system 182. In response to the leak signal, controller 214 may reduce a pressure in pressure chamber 202, so that spring element 296 closes PRV 114.

Figure 3:
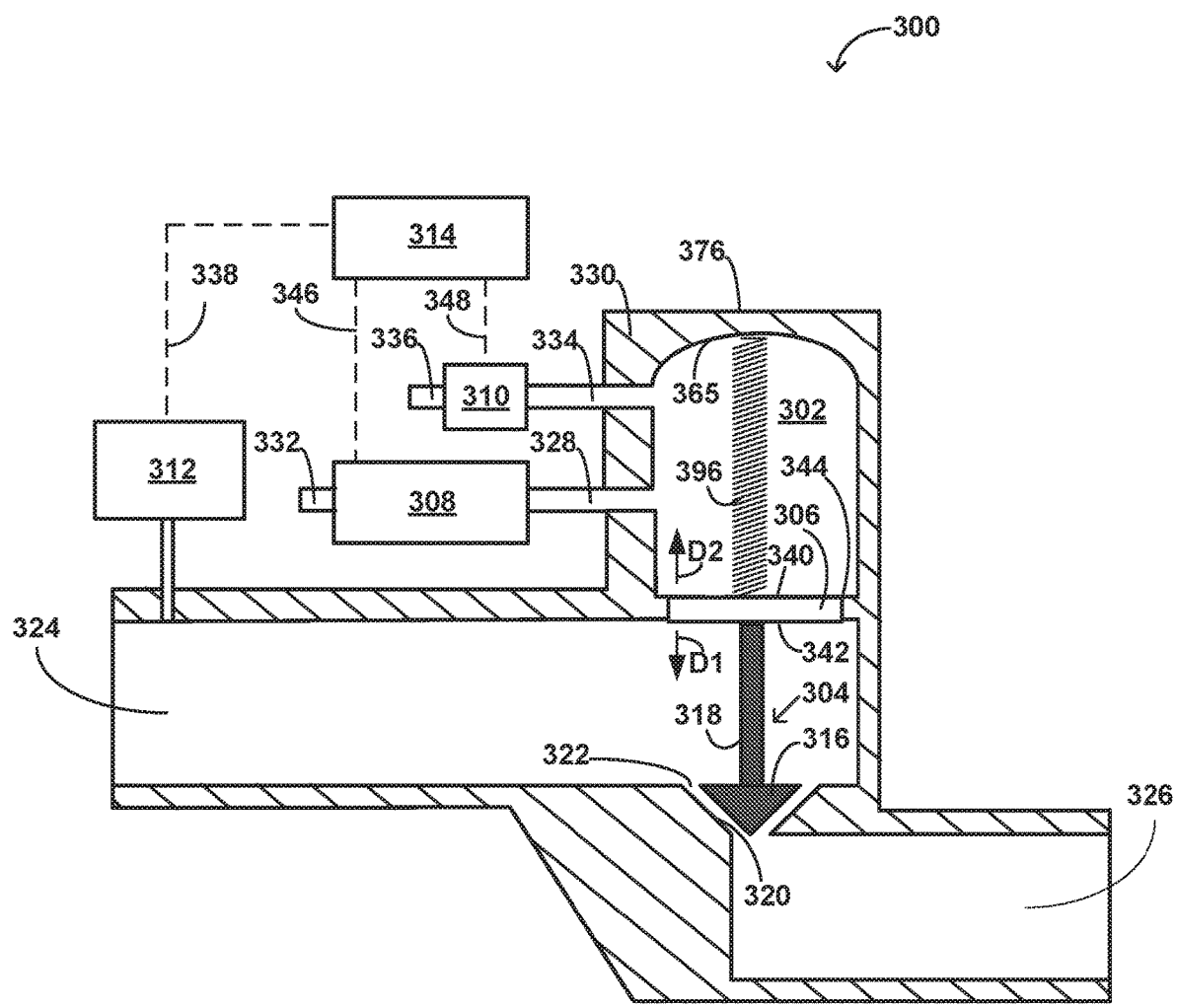
FIG. 3 is a conceptual diagram illustrating an example pressure regulating valve including a controller and an inlet pressure sensor.

In some examples, a PRV may be configured to function as a back-pressure regulator, to substantially maintain a pressure of fluid flow upstream of the flow area of the pressure regulating valve. For example, FIG. 3 illustrates an example PRV 300 configured to function as a back-pressure regulator. PRV 300 comprises PRV inlet 324 and PRV outlet 326 and is configured to provide a flow path for a fluid between PRV inlet 324 and PRV outlet 326. PRV 300 may be configured to receive a fluid at PRV inlet 324 and regulate a fluid flow through flow area 322 and PRV outlet 326, in order to substantially maintain a pressure of a flow section upstream of flow area 322. For example, PRV 300 may be configured receive a fluid from main circuit 102 and regulate a fluid flow to fluid conduit 164 to substantially maintain a fluid pressure in main circuit 102 (FIG. 1). PRV 300 may be an example of PRV 150 described with reference to FIG. 1. PRV inlet 324, flow area 322, and PRV outlet 326 may be configured individually and relation to each other in the same manner as that discussed for the like-named components of PRV 200.

As illustrated, PRV 300 further comprises restricting element 304, valve disc 316, valve stem 318, valve seat 320, sensing element 306 defining first side 340, second side 342, and perimeter 344, pressure chamber 302, housing 330 having a housing exterior 376 and a boundary 365, controller 314, pressure sensor 312, compressor 308, compressor conduit 328, compressor inlet 332, vent valve 310, vent valve outlet 336, vent conduit 334, sensor communication link 338, compressor communication link 346, vent valve communication link 348, and spring element 396, which may be configured individually and relation to each other in the same manner as that discussed for the like-named components of PRV 200.

For example, sensing element 306 is configured to influence the translation of restricting element 304. For example, sensing element 306 may be mechanically coupled to restricting element 304. Sensing element 306 includes first side 340 and a second side 342, and may be configured such that sensing element 306 experiences motion based on a differential pressure between first side 340 and second side 342. The differential pressure may arise from a first pressure acting on first side 340 and a second pressure acting on second side 342. For example, sensing element 306 may comprise a diaphragm or a piston having a first side and a second side.

The first pressure acting on first side 340 of sensing element 306 may arise from a gas pressure within a pressure chamber 302. The second pressure acting on second side 342 of sensing element 306 may arise from fluid communication with one or more fluid sections of a fluid between and including PRV inlet 324 and flow area 322. Thus, the differential pressure experienced across sensing element 306 may be dependent on both a gas pressure within pressure chamber 302 and a fluid pressure between and including PRV inlet 324 and PRV outlet 326.

PRV 300 may be configured to adjust flow area 322 in response to changes in an upstream pressure, such as a pressure at PRV inlet 324, or some other fluid section upstream of flow area 322. For example, with a substantially constant gas pressure (e.g., constant or nearly constant, such as less than or equal to a 5% change) in pressure chamber 302, an increase in the upstream pressure may increase the second pressure acting on second side 342, and cause sensing element 306 to reposition restricting element 304 in a manner that increases flow area 322 (e.g., sensing element 306 may reposition restricting element 304 in an opening direction such as D2 to increase flow area 222). The increased flow area 322 may cause a decrease in the upstream pressure at, for example, PRV inlet 324, or some other fluid section upstream of flow area 322.

Alternatively, with a substantially constant gas pressure in pressure chamber 302, a decrease in upstream pressure may decrease the second pressure acting on second side 342, and cause sensing element 306 to reposition restricting element 304 in a manner that decreases flow area 322 (e.g., sensing element 306 may reposition restricting element 304 in a closing direction such as D1 to decrease flow area 322). The decreased flow area 322 may cause an increase in the upstream pressure at, for example, PRV inlet 324, or some other flow section upstream of flow area 322. In some examples, a decrease in upstream pressure may result in sensing element 306 acting to fully shut PRV 300.

PRV 300 may be configured such that sensing element 306 operates around a specific pressure setpoint, based on the gas pressure in pressure chamber 302. Increases in upstream pressure above the setpoint may cause sensing element 306 to translate restricting element 304 to increase flow area 322 (e.g., cause sensing element 306 to move in the direction D2) and decrease the upstream pressure. Decreases in upstream pressure below the setpoint may cause sensing element 306 to translate restricting element 304 to decrease flow area 322 (e.g., cause sensing element 306 to move in the direction D1) and increase the downstream pressure. In this manner PRV 300 may regulate a flow from PRV inlet 324 to PRV outlet 326 to substantially maintain a fluid pressure upstream of flow area 322, based on a differential pressure across sensing element 306. For example, PRV 300 may maintain the upstream pressure within 1% to 30% of a setpoint pressure, such as within 1%, 5%, 10%, 20%, or 30% of the setpoint pressure.

Controller 314 is configured to establish a pressure setpoint by increasing or decreasing a gas pressure in pressure chamber 302. To control the pressure within pressure chamber 302, controller 314 may, at various times, conduct one or more of: direct compressor 308 to commence charging a gas into pressure chamber 302, direct compressor 308 to cease charging the gas into pressure chamber 302, direct vent valve 310 to fully or partially open and provide fluid communication between pressure chamber 302 and vent valve outlet 336, and direct vent valve 310 to fully or partially close and cease or reduce a fluid communication between pressure chamber 302 and vent valve outlet 336. As discussed below, the action selected by controller 314 for compressor 308 and vent valve 310 may depend on whether controller 314 is increasing or decreasing pressure within pressure chamber 302.

Controller 314 may communicate with compressor 308 via compressor communication link 346 and direct compressor 308 to increase the gas pressure in pressure chamber 302. Controller 314 may communicate with vent valve 310 via vent valve communication link 348 and direct vent valve 310 to establish a valve position that decreases the gas pressure in pressure chamber 302.

PRV 300 further includes a pressure sensor 312 configured to generate a signal indicative of a pressure. For example, as depicted at FIG. 3, pressure sensor 312 may be configured to generate a signal indicative of a pressure at PRV inlet 324 and/or indicative of a pressure upstream of flow area 322. Controller 314 is configured to receive the signal indicative of the pressure from pressure sensor 312. Controller 314 may receive the signal indicative of the pressure via, for example, sensor communication link 338 between controller 314 and pressure sensor 312. Controller 314 may be configured to compare the signal indicative of the pressure received from pressure sensor 312 with a pressure setpoint. The pressure setpoint may be stored in a memory of controller 314 or a memory of another device. Based on the comparison of the indicative signal from pressure sensor 312 and the pressure setpoint, controller 314 may be configured to increase or decrease a pressure in pressure chamber 302 using compressor 308 (to increase the pressure) or vent valve 310 (to decrease the pressure), e.g., as discussed with respect to controller 214, compressor 208, and vent valve 210 of FIG. 2.

Utilizing compressor 308 and vent valve 310, controller 314 may be configured to increase or decrease the pressure of an upstream fluid branch in fluid communication with PRV inlet 324 of PRV 300. For example, to increase or decrease a pressure in the upstream fluid branch, controller 314 may receive or establish a revised pressure setpoint reflective of the new desired pressure. Based on a comparison of the revised setpoint and a signal indicative of the pressure provided by pressure sensor 312, controller 314 may control compressor 308 and/or vent valve 310 to increase or decrease the pressure in pressure chamber 302, causing PRV 300 to establish a configuration causing an increase or decrease of the pressure at PRV inlet 324, until a comparison of the revised setpoint and the signal indicative of the pressure provided by pressure sensor 312 indicates the pressure in pressure chamber 302 is satisfactory (e.g., within a predetermined range of the pressure setpoint, such as within 5% to 30%, such as within 5%, 10%, 20%, or 30% of the pressure setpoint in various examples).

In some examples, PRV 300 may be a normally-seated valve. PRV 300 may be configured such that a movement of sensing element 306 in a direction away from valve seat 320 (e.g., in the direction D2) causes restricting element 304 to translate and increase flow area 322. The movement of sensing element 306 away from valve seat 320 may be caused by a decrease in the pressure of a fluid section within PRV 300. The fluid section may be a fluid section upstream of flow area 322. The movement of sensing element 306 away from valve seat 320 may be caused by a decrease in the pressure of a gas within pressure chamber 302. Controller 314 may decrease the pressure of the gas within pressure chamber 304 causing sensing element 306 to move in a direction away from valve seat 320 (e.g., in the direction D2) and increase flow area 322. The increase in flow area 322 may reduce the pressure drop of a fluid flowing through flow area 322 (or initiate a fluid flow through flow area 322), decreasing the pressure at PRV inlet 324.

PRV 300 may be configured such that a movement of sensing element 306 in a direction toward valve seat 320 (e.g., in the direction D1) causes restricting element 304 to translate and decrease flow area 322. The movement of sensing element 304 toward valve seat 320 may be caused by a decrease in the pressure of a fluid section within PRV 300. The fluid section may be a fluid section upstream of flow area 322. The movement of sensing element 304 toward from valve seat 320 may be caused by an increase in the pressure of a gas within pressure chamber 302. Controller 314 may increase the pressure of the gas within pressure chamber 302 causing sensing element 306 to move in a direction toward valve seat 320 (e.g., in the direction D1) and decrease flow area 322. The decrease in flow area 322 may increase the pressure drop of a fluid flowing through flow area 322 (or cease a fluid flow through flow area 322), increasing the pressure at PRV inlet 324.

Restricting element 304 includes any suitable structure and is configured to translate in directions D1 and D2 using any suitable structure. In some examples, PRV 300 may include spring element 396. Spring element 396 may be configured to transmit a force to restricting element 304 substantially in the direction D1, biasing restricting element 304 to translate in a manner reducing or eliminating flow area 322. Spring element 396 may act as a shut off mechanism for PRV 300, acting to reduce or eliminate flow area 322 when controller 314 recognizes a condition under which PRV 300 should close and, in response, opens vent valve 310 to reduce the pressure in pressure chamber 302. For example, in some examples, controller 314 is configured to receive a leak signal from a leak detection system monitoring a fluid branch upstream of PRV 300, and, in response to receiving the leak signal, controller 314 opens vent valve 310 and reduces the pressure in pressure chamber 302 to a level where spring element 396 causes restricting element 304 to translate and close PRV 300.

In some examples, controller 214 (FIG. 2) and/or controller 314 (FIG. 3) may comprise a Proportional-Integral-Derivative (PID) controller. The PID controller may receive a pressure signal from a pressure sensor such as pressure sensor 212 and/or pressure sensor 312 as a process variable, and may periodically determine an error based on a difference between a pressure setpoint and a pressure indicated by the pressure signal. The PID controller may produce a control signal based on the error. Controller 214 may control compressor 208 and/or vent valve 210 based on the control signal. Controller 314 may control compressor 308 and/or vent valve 310 based on the control signal.

The PID controller may produce the control signal using a proportional term (P) proportional to the value of the error. The PID may produce the control signal using an integral term (I) based on past values of the error integrated over time. The PID may produce the control signal using a derivative term (D) based on a rate of change of the error. The PID controller may determine the control signal based on a weighted sum of the P, I, and/or D terms. The PID controller may be a digital PID controller which converts an analog pressure signal from a sensor to a digital signal using an analog-to-digital (A/D) convertor. The PID controller may comprises one or more analog components such as one or more operational amplifiers.

Figure 4:
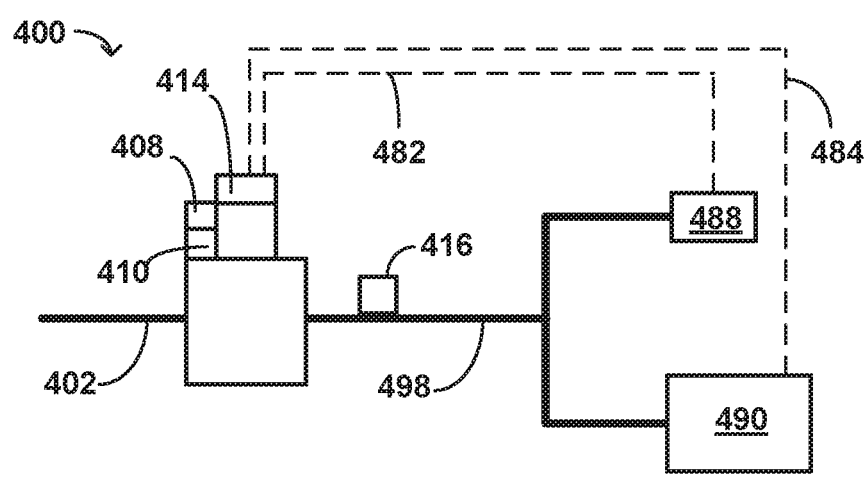
FIG. 4 is a conceptual diagram illustrating an example pressure regulating valve and a plurality of fluid loads.

The controller comprising the pressure regulating valve may be configured to receive a communication signal from, for example, one or more fluid loads, and determine a pressure setpoint based on the communication signal. FIG. 4 is a conceptual diagram of an example PRV 400 comprising at least a vent valve 408, a compressor 410, a controller 414, and a pressure sensor 416. Components of PRV 400 may be configured individually and relation to each other in the same manner as that discussed for the like-named components of PRV 200.

A fluid circuit 498 is configured to provide fluid to fluid load 488 and fluid load 490. Fluid load 488 and fluid load 490 may be parallel fluid loads. Each of fluid load 488 and fluid load 490 are configured to communicate with controller 414 when the respective loads are actuated. Fluid load 488 may communicate with controller 414 via communication link 482. Fluid load 490 may communicate with controller 414 via communication link 484. Communication links 482, 484 may be hard-line and/or wireless communications links, e.g., any of the example communication links described above.

PRV 400 is configured to receive a fluid from fluid circuit 402 and provide fluid to fluid circuit 498 at a pressure based on a pressure setpoint. The pressure setpoint may be based on the actuation of fluid load 488 and/or fluid load 490. For example, controller 414 may be configured to receive a first signal from fluid load 488 via communication link 482 and establish a first pressure setpoint in response to the first signal. Controller 414 may direct compressor 410 to increase pressure in a pressure chamber (not shown) of PRV 400 and/or direct vent valve 408 to decrease pressure in the pressure chamber of PRV 400, until pressure sensor 416 indicates the first setpoint has been established in fluid circuit 498 (e.g., the pressure in fluid circuit 498 is within a predetermined range of the first setpoint, such as equal to or within 1% to 30% of the first setpoint).

Controller 414 may be configured to receive a second signal from fluid load 490 via communication link 484 and establish a second pressure setpoint in response to the second signal. The second setpoint may be different (e.g. higher or lower) than the first setpoint. Controller 414 may direct compressor 410 to increase pressure in a pressure chamber (not shown) of PRV 400 and/or direct vent valve 408 to decrease pressure in the pressure chamber of PRV 400, until pressure sensor 416 indicates the second setpoint has been established in fluid circuit 498 (e.g., the pressure in fluid circuit 498 is within a predetermined range of the second setpoint, such as equal to or within 1% to 30% of the second setpoint).

In some examples, controller 414 may also be configured to establish a third pressure setpoint based on receipt of both the first signal from fluid load 488 and the second signal from fluid load 490. Controller 414 may be configured to receive signals and establish a pressure setpoint for any number of fluid loads, and establish a pressure setpoint for any combination of fluid loads.

For example, fluid circuit 402 might be a municipal water main and fluid circuit 498 might be a residential water main. PRV 400 may be configured to receive a higher pressure fluid from fluid circuit 402 and provide a lower pressure fluid to fluid circuit 498. Fluid load 488 and fluid load 490 may be residential fluid loads. For example, fluid load 488 might be kitchen faucet while fluid load 490 might be a dishwasher. It may be advantageous for PRV 400 to substantially maintain fluid circuit 498 at different pressures depending on which or fluid loads 488, 490 are in operation. Controller 414 may be configured to substantially maintain a first pressure in fluid circuit 498 when fluid load 490 (e.g., dishwasher) is actuated (e.g., operating and using water), based on the anticipated water demand of fluid load 490. Controller 414 may be configured to substantially maintain a second pressure less than the first pressure when fluid load 488 (e.g., kitchen faucet) is actuated, in order to reduce over-supply of water for the generally lower water demand of tasks typically performed with fluid load 488. It may be advantageous to configure controller 414 to substantially maintain a third pressure greater than the first pressure and the second pressure when both fluid load 488 and fluid load 490 are actuated, in order to provide a sufficient flow of fluid through the residential piping when both loads are operating simultaneously.

PRV 400 may also be configured to operate as a back-pressure regulator substantially maintaining a pressure in fluid circuit 498 and providing a fluid flow from fluid circuit 498 to fluid circuit 402 to substantially maintain the pressure. Fluid load 488 and fluid load 490 may require differing pressure setpoints for fluid circuit 498. For example, fluid load 488 may be a first bank of flow spray nozzles operating effectively at a first pressure while fluid load 490 may be a second bank of spray nozzles operating effectively at a second pressure different from the first pressure. Controller 414 may be configured to receive a signal from each of fluid load 488 and fluid load 490, and establish a pressure setpoint for fluid circuit 498 depending on whether the first pressure or second pressure is desired.

The compressor, vent valve, sensor, and controller of PRV 400 may be configured individually and relation to each other in the same manner as that discussed for the like-named components of PRV 200 and/or PRV 300. PRV 400 may also comprise a PRV inlet, a flow area, a PRV outlet, a restricting element, a valve disc, a valve stem, a valve seat, a sensing element, a first side, a second side, a perimeter, a pressure chamber, a housing, a housing exterior, a boundary, a compressor conduit, a compressor inlet, a vent valve outlet, a vent conduit, a sensor communication link, a compressor communication link, a vent valve communication link, and a spring element, which may be configured individually and relation to each other in the same manner as that discussed for the like-named components of PRV 200 and/or PRV 300.

Figure 5:
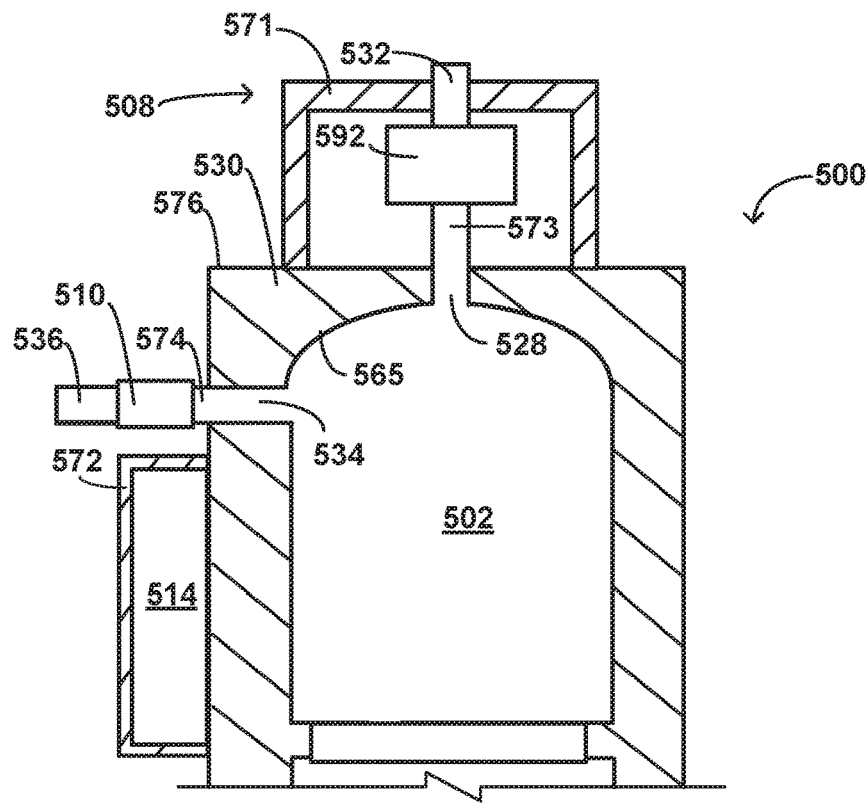
FIG. 5 is a conceptual diagram illustrating an example pressure chamber of a pressure regulating valve.

A compressor of a PRV may comprise a compressor housing mechanically coupled to or integral with the housing exterior of the PRV. FIG. 5 illustrates a portion of an example PRV 500 comprising an example compressor 508. Compressor 508 includes a compressing element 592 in fluid communication with compressor inlet 532 and compressor outlet 573. Compressing element 592 is configured to establish a suction at compressor inlet 532 and provide a discharge at compressor outlet 573. Compressing element 592 may comprise, for example, an impellor or a piston.

Compressor 508 includes compressor housing 571 at least partially surrounding compressing element 592. Compressor housing 571 may be mechanically coupled to or integral with housing exterior 576 of PRV 500. Compressor outlet 573 may be in fluid communication with compressor conduit 528, which is in fluid communication with pressure chamber 502. For example, compressor conduit 528 may extend through housing 530, housing exterior 576, and/or boundary 565 of pressure chamber 502.

In some examples, a vent valve of a PRV may be mechanically coupled to or integral with the exterior housing of the PRV. FIG. 5 illustrates an example vent valve 510 mechanically coupled to or integral with housing exterior 576. Vent valve inlet 574 of vent valve 510 is in fluid communication with vent conduit 534, which is in fluid communication with pressure chamber 502. For example, vent conduit 534 may extend through housing 530, housing exterior 576, and/or boundary 565. Vent valve 510 may comprise one or more valve components configured to fluidly isolate vent valve inlet 574 and vent valve outlet 536.

In some examples, a controller of a PRV may be positioned outside the housing of the PRV or may be mechanically coupled to or integral with the housing exterior of the pressure regulating valve. FIG. 5 illustrates an example controller 514 at least partially surrounded by controller housing 572, with controller housing 572 mechanically coupled to or integral with housing exterior 576. In some examples, a single housing (not shown) may cover one or more of controller 514, compressor 508, and vent valve 510, in any combination. The single housing may be mechanically coupled to or integral with housing exterior 576. Controller housing 572 is configured to protect circuitry of controller 514 from environmental contaminants.

Pressure chamber 502, housing 530, housing exterior 576, boundary 565, controller 514, compressor 508, compressor conduit 528, compressor inlet 532, vent valve 510, vent valve inlet 574, vent valve outlet 536, and vent conduit 534 may be configured individually and relation to each other in the same manner as that discussed for the like-named components of PRV 200, PRV 300, and/or PRV 400. In some examples, PRV 500 may also comprise a PRV inlet, a flow area, a PRV outlet, a restricting element, a valve disc, a valve stem, a valve seat, a sensing element, a first side, a second side, a perimeter, a pressure sensor, a sensor communication link, a compressor communication link, a vent valve communication link, and a spring element, which may be configured individually and relation to each other in the same manner as that discussed for the like-named components of PRV 200, PRV 300, and/or PRV 400.

Figure 6:
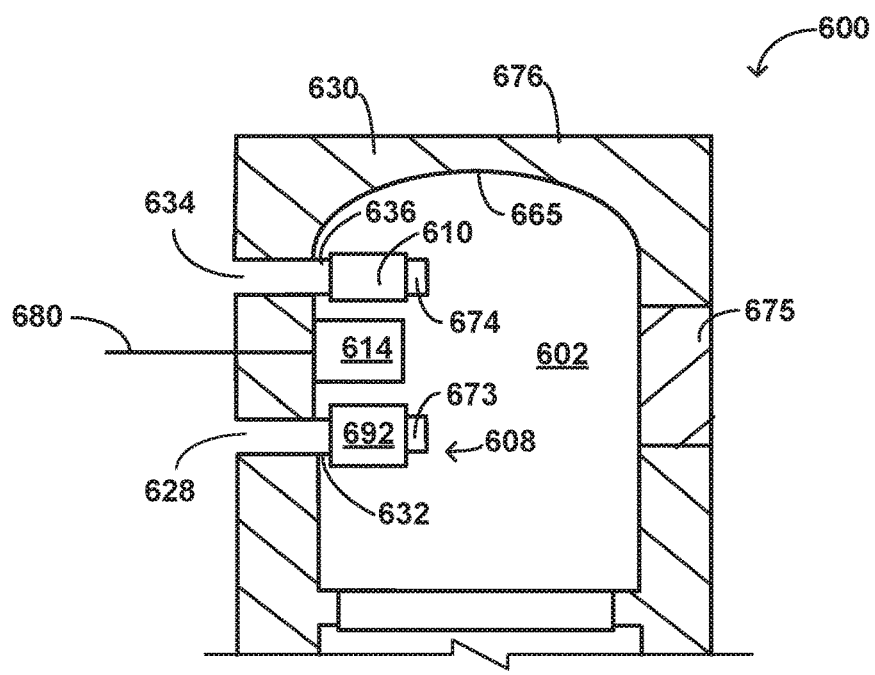
FIG. 6 is a conceptual diagram illustrating another example of a pressure chamber of a pressure regulating valve.

In some examples, a compressor of a PRV may be internal to a pressure chamber of the PRV, the pressure chamber being the same pressure chamber that the controller can introduce gases into. FIG. 6 illustrates a portion of an example PRV 600 comprising compressor 608, which is an example compressor that is substantially within pressure chamber 602 and is likewise surrounded by housing 630. Compressor 608 can be configured like the example compressors described with reference to FIGS. 2-5, but is positioned substantially within pressure chamber 602. For example, compressor 608 may be surrounded by the volume within the gas-tight boundary of pressure chamber 602. Compressor inlet 632 of compressor 608 is fluidically connected to compressor outlet 673 via compressor conduit 628, which extends through housing 630, housing exterior 676, and/or boundary 665. Compressor outlet 673 is in fluid communication with pressure chamber 602. Compressor 608 may comprise compressing element 692 in fluid communication with compressor inlet 632 and compressor outlet 673. Compressing element 692 may be surrounded by pressure chamber 602 such that compressor inlet 632 is in fluid communication with compressor conduit 628 extending through housing 630, housing exterior 676, and/or boundary 665, and compressor outlet 673 is in fluid communication with the volume within the gas-tight boundary of pressure chamber 602.

In some examples, a vent valve of a PRV can be internal to a pressure chamber of the PRV, the pressure chamber being the same pressure chamber from which the vent valve releases gases. FIG. 6 illustrates an example of a vent valve 610 that substantially within pressure chamber 602 and surrounded by housing 630. Vent valve 636 can be configured like the example vent valves described with reference to FIGS. 2-5, but is positioned substantially within pressure chamber 602. Vent valve outlet 636 of vent valve 610 is in fluid communication with vent inlet 674 via vent conduit 634, which may extend through housing 630, housing exterior 676, and/or boundary 665. Vent valve inlet 674 may be in fluid communication with pressure chamber 602. Vent valve 610 may comprise one or more valve components configured to fluidly isolate vent valve inlet 674 and vent valve outlet 636. Vent valve 610 may be surrounded by pressure chamber 602 such that vent valve outlet 636 is in fluid communication with vent conduit 634 extending through housing 630 and/or boundary 665, and vent valve inlet 674 is in fluid communication with the volume within the gas-tight boundary of pressure chamber 602.

In some examples, a controller of a PRV can be internal to a pressure chamber of the PRV, the pressure chamber being a chamber for which the controller controls the pressure. FIG. 6 illustrates an example controller 614 that is substantially within pressure chamber 602 and surrounded by housing 630. Controller 614 can be configured like the example controllers described with reference to FIGS. 2-5, but is positioned substantially within pressure chamber 602. In some examples, a hard-line connection 680 may extend through housing 630, exterior housing 676, and/or boundary 665. Hard-line connection 680 may be in electrical communication with controller 614. Hard-line connection 680 may be configured to provide data communications and/or electrical power to controller 614.

A hatch 675 may be configured to allow access into pressure chamber 602 through housing 630, housing exterior 676, and/or boundary 665. Hatch 675 may be configured to have an open position providing access to the volume within pressure chamber 602 and have a closed position, where hatch 675 forms a portion of the gas-tight boundary around pressure chamber 602 when in the closed position.

Pressure chamber 602, housing 630, housing exterior 676, boundary 665, controller 614, compressor 608, compressor element 692, compressor conduit 628, compressor inlet 632, compressor outlet 673, vent valve 610, vent valve outlet 636, vent valve inlet 674, and vent conduit 634 may be configured individually and relation to each other in the same manner as that discussed for the like-named components of PRV 200, PRV 300, PRV 400, and/or PRV 500. In some examples, PRV 600 may also comprise a PRV inlet, a flow area, a PRV outlet, a restricting element, a valve disc, a valve stem, a valve seat, a sensing element, a first side, a second side, a perimeter, a sensor, a sensor communication link, a compressor communication link, a vent valve communication link, and a spring element, which may be configured individually and relation to each other in the same manner as that discussed for the like-named components of PRV 200, PRV 300, PRV 400 and/or PRV 500.

Figure 7:
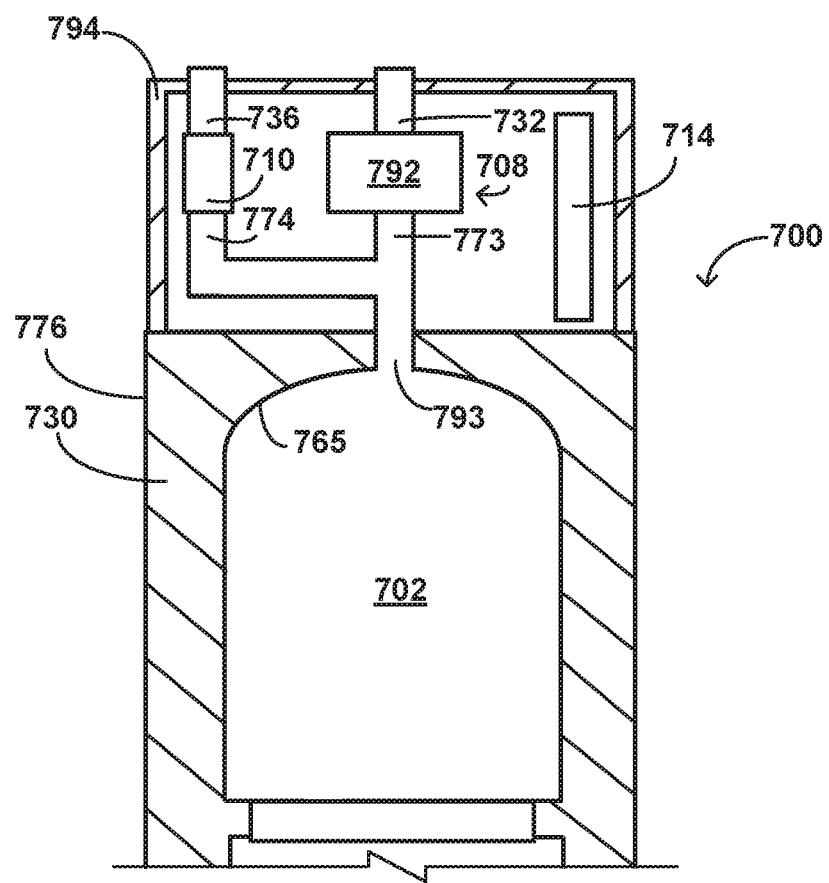
FIG. 7 is a conceptual diagram illustrating an additional example of a pressure chamber of a pressure regulating valve.

In examples, a vent valve and a compressor of a PRV may both be in fluid communication with a chamber conduit extending through the housing, housing exterior, and/or boundary of the pressure chamber. For example, FIG. 7 illustrates a portion of an example PRV 700 comprising vent valve 710, compressor 708, and controller 714. Vent valve 710, compressor 708, and controller 714 are surrounded by a control housing 794. Control housing 794 may be mechanically coupled to or integral with housing exterior 776.

Vent valve 710 comprises vent valve outlet 736 and vent valve inlet 774. Vent valve 710 may comprise one or more valve components configured to fluidly isolate vent valve inlet 774 and vent valve outlet 736. Vent valve inlet 774 may be configured to be in fluid communication with chamber conduit 793. Chamber conduit 793 may extend through housing 730, housing exterior 776, and/or boundary 765. Compressor 708 may comprise compressing element 792 in fluid communication with compressor inlet 732 and compressor outlet 773. Compressor outlet 573 may be configured to be in fluid communication with chamber conduit 593.

Pressure chamber 702, housing 730, housing exterior 776, boundary 765, controller 714, compressor 708, compressor inlet 732, compressor element 792, compressor outlet 773, vent valve 710, vent valve outlet 736, and vent valve inlet 774 may be configured individually and relation to each other in the same manner as that discussed for the like-named components of PRV 200, PRV 300, PRV 400, PRV 500, and/or PRV 600. In some examples, PRV 700 may also comprise a PRV inlet, a flow area, a PRV outlet, a restricting element, a valve disc, a valve stem, a valve seat, a sensing element, a first side, a second side, a perimeter, a pressure sensor, a sensor communication link, a compressor communication link, a vent valve communication link, a spring element, a hatch, and a hard-line connection, which may be configured individually and relation to each other in the same manner as that discussed for the like-named components of PRV 200, PRV 300, PRV 400, PRV 500, and/or PRV 600.

Figure 8:
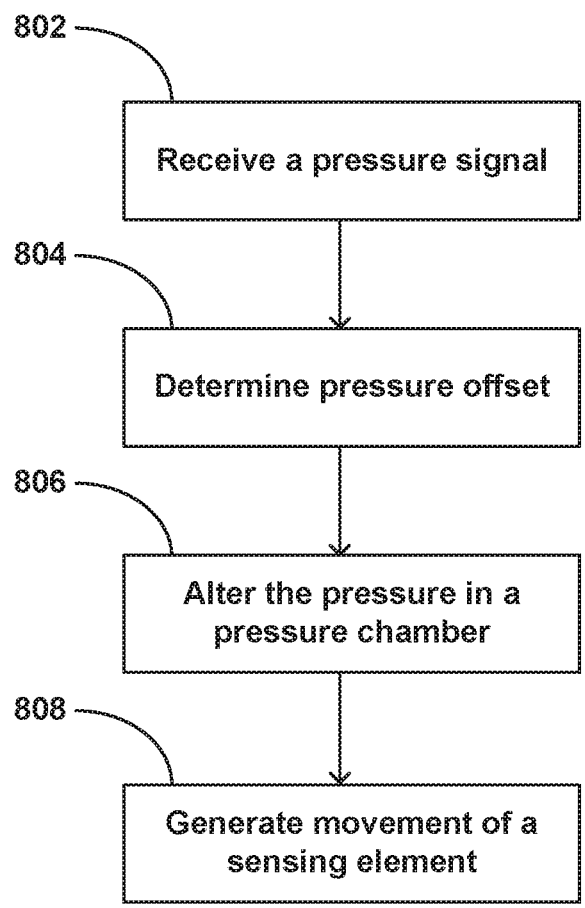
FIG. 8 is a flow diagram illustrating an example technique for controlling a pressure in a fluid circuit.

FIG. 8 illustrates a flow diagram of an example technique for regulating a pressure. Although the technique is described with reference to PRV 200 of FIG. 2, in other examples, the technique may be used with another PRV. In addition, controller 214 of PRV alone or in combination with controllers of other devices can perform any part of the technique shown in FIG. 8.

Controller 214 receives a pressure signal indicative of a pressure (802). In some examples, the pressure signal may be indicative of a pressure at valve outlet 226 of PRV 200. In some examples, pressure sensor 212 generates the pressure signal indicative of the pressure and transmits the signal to controller 214 using any suitable communication link. Controller 214 determines a pressure offset between the pressure indicated by the pressure signal and a pressure setpoint (804). For example, controller 214 can determine the pressure based on a signal characteristic of the pressure signal, such as an amplitude or frequency of the pressure signal. As an example, controller 214 can compare the signal characteristic of the pressure signal to predetermined pressure values and determine the pressure associated with the signal characteristic, e.g., in a memory of controller 214 or another device. The pressure setpoint referenced by controller 214 can also be stored in a memory of controller 214 or another device.

Controller 214 alters a pressure in pressure chamber 202 of PRV 200 based on the determined pressure offset (806). For example, controller 214 may alter the pressure by directing compressor 208 to charge pressure chamber 202 and increase the pressure in pressure chamber 202. In addition, or instead, controller 214 may alter the pressure by directing vent valve 210 to vent pressure chamber 202 and decrease the pressure in the pressure chamber. For example, in response to determining the pressure offset indicates the pressure indicated by pressure sensor 212 is greater than the pressure setpoint, controller 214 may alter the pressure by directing vent valve 210 to vent pressure chamber 202 and decrease the pressure in the pressure chamber, causing sensing element 206 to reposition restricting element 204 in a manner that increases a pressure drop of a fluid as it flows through flow area 222. In response to determining the pressure offset indicates the pressure indicated by pressure sensor 212 is less than the pressure setpoint, controller 214 may alter the pressure by directing compressor 208 to charge pressure chamber 202 and increase the pressure in the pressure chamber, causing sensing element 206 to reposition restricting element 204 in a manner that decreases a pressure drop of a fluid as it flows through flow area 222.

As a result of the pressure in pressure chamber 202 being altered (806), controller 214 causes sensing element 206 in fluid communication with pressure chamber 202 to move (808), where movement of sensing element 206 alters flow area 222 between valve inlet 224 and valve outlet 226. As discussed above, the size (e.g., volume) of flow area 22 affects the fluid pressure in the fluid circuit including PRV 200. For example, increasing flow area 222 can decrease pressure through PRV 200 and decreasing flow area 222 can increase pressure through PRV 200.

In one or more examples, functions described herein may be implemented in hardware, software, firmware, or any combination thereof. For example, the various components and functions of FIGS. 1-8 may be implemented in hardware, software, firmware, or any combination thereof. If implemented in software, the functions may be stored on a tangible computer-readable storage medium and executed by a processor or hardware-based processing unit.

Instructions may be executed by one or more processors, such as one or more DSPs, general purpose microcontrollers, ASICs, FPGAs, or other equivalent integrated or discrete logic circuitry. Accordingly, the term "processor," as used herein, such as may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described Various examples have been described. These and other examples are within the scope of the following claims.

What is claimed is:

1. A pressure regulating valve comprising:
    a pressure chamber of the pressure regulating valve;
    a compressor configured to establish fluid communication with the pressure chamber;
    a vent valve configured to establish fluid communication with the pressure chamber;
    a pressure sensor configured to generate a signal indicative of a pressure; and
    a controller configured to:
        determine a pressure setpoint for the pressure;
        determine the pressure based on the signal generated by the pressure sensor;
        compare the pressure setpoint and the pressure; and
        increase or decrease pressure in the pressure chamber based on the comparison of the pressure setpoint and the pressure, wherein the controller is configured to increase the pressure in the pressure chamber by at least controlling the compressor to increase pressure in the pressure chamber, and wherein the controller is configured to decrease the pressure in the pressure chamber by at least controlling the vent valve to decrease pressure in the pressure chamber.

2. The pressure regulating valve of claim 1, further comprising:
    a restricting element; and
    a sensing element in fluid communication with the pressure chamber,
    wherein the sensing element is configured to position in response to the pressure in the pressure chamber, and
    wherein the sensing element is configured to influence a position of the restricting element.

3. The pressure regulating valve of claim 2, wherein the restricting element comprises a valve disc, and wherein the pressure regulating valve further comprises:
    a valve stem attached to the valve disc;
    a valve seat; and
    a flow area between the valve disc and the valve seat, wherein the sensing element is configured to translate the valve stem and alter the flow area in response to the controller increasing or decreasing pressure in the pressure chamber.

4. The pressure regulating valve of claim 3, wherein the sensing element is configured to translate the valve stem and reduce the flow area in response to the controller increasing pressure in the pressure chamber, and wherein the sensing element is configured to translate the valve stem and increase the flow area in response to the controller decreasing pressure in the pressure chamber.

5. The pressure regulating valve of claim 3, wherein the sensing element is configured to translate the valve stem and increase the flow area in response to the controller increasing pressure in the pressure chamber, and wherein the sensing element is configured to translate the valve stem and decrease the flow area in response to the controller decreasing pressure in the pressure chamber.

6. The pressure regulating valve of claim 2, further comprising a spring element configured to translate the valve stem and reduce the flow area.

7. The pressure regulating valve of claim 1, further comprising a valve inlet and a valve outlet, wherein the pressure regulating valve is configured to fluidly isolate the pressure chamber from the valve inlet and the valve outlet.

8. The pressure regulating valve of claim 1, wherein the controller comprises a Proportional-Integral-Derivative (PID) controller, wherein the PID controller is configured to compare the pressure setpoint and the pressure, and use the pressure as a process variable.

9. The pressure regulating valve of claim 1, wherein the controller is configured to:
    receive a communication signal; and
    determine the pressure setpoint by at least associating the communication signal with a specific pressure.

10. The pressure regulating valve of claim 1, wherein the controller is configured to:
    receive a fluid leak signal; and
    increase or decrease the pressure in the pressure chamber to cause the sensing element to influence the restricting element to reduce or cease a flow through the pressure regulating valve in response to receiving the fluid leak signal.

11. The pressure regulating valve of claim 1, wherein the pressure regulating valve comprises at least one of a poppet valve, a needle valve, a gate valve, a globe valve, a double-ported valve, or a spool valve.

12. A pressure regulating system comprising:
    a valve comprising:
        a pressure chamber;
        a valve inlet;
        a valve outlet;
        a sensing element in fluid communication with the pressure chamber, wherein the sensing element is configured to displace when a pressure in the pressure chamber increases or decreases; and
        a restricting element mechanically coupled to the sensing element, wherein the restricting element is configured to alter a flow area between the valve inlet and the valve outlet when the sensing element displaces; and
    a controller configured to:
        determine a pressure setpoint,
        receive a signal indicative of a pressure,
        compare the pressure setpoint and the signal indicative of the pressure,
        control, based on the comparison, a compressor to increase the pressure in the pressure chamber and displace the sensing element and cause the restricting element to alter the flow area, and control, based on the comparison, a vent valve to decrease the pressure in the pressure chamber and displace the sensing element and cause the restricting element to alter the flow area.

13. The pressure regulating system of claim 12, wherein the sensing element comprises a diaphragm, a piston, or a diaphragm and a piston.

14. The pressure regulating system of claim 12, wherein the pressure comprises the pressure at the valve inlet, the system further comprising a pressure sensor configured to generate the signal indicative of the pressure at the valve inlet.

15. The pressure regulating system of claim 12, further comprising a main valve comprising a main valve stem, wherein the valve is a pilot valve configured to control a position of the main valve stem.

16. The pressure regulating system of claim 12, wherein the restricting element comprises a valve disc, and wherein the valve further comprises a valve stem mechanically coupling the valve disc to the sensing element, wherein the valve disc is configured to alter the flow area between the valve inlet and the valve outlet when the sensing element displaces.

17. The pressure regulating system of claim 12, further comprising:
the compressor;
the vent valve; and
a pressure sensor configured to generate the signal indicative of the pressure at the valve inlet.

18. A method of regulating a pressure, the method comprising:
receiving, by a controller, a pressure signal indicative of a pressure;
determining, by the controller, the pressure based on the signal;
determining, by the controller, a pressure offset between the pressure and a pressure setpoint;
increasing, by the controller, a pressure in a pressure chamber of a pressure regulating valve based on the pressure offset by at least causing a compressor to increase the pressure in the pressure chamber; and
decreasing, by the controller, the pressure in the pressure chamber of the pressure regulating valve based on the pressure offset by at least causing a vent valve to vent the pressure chamber and decrease the pressure in the pressure chamber,
wherein increasing or decreasing the pressure in the pressure chamber causes movement of a sensing element in fluid communication with the pressure chamber, and wherein the movement of the sensing element alters a flow area between a valve inlet and a valve outlet.

19. The method of claim 18, wherein receiving the pressure signal comprises receiving, by the controller, the pressure signal from a pressure sensor, wherein the pressure signal is indicative of a pressure at the valve inlet.

20. The method of claim 18, wherein movement of the sensing element alters the flow area by at least causing a restricting element to translate a valve stem and a valve disc, wherein the valve disc is in fluid communication with the flow area.

* * * * *